(12) United States Patent
Johnson

(10) Patent No.: US 7,752,845 B2
(45) Date of Patent: Jul. 13, 2010

(54) SOLAR-POWERED, LIQUID-HYDROCARBON-FUEL SYNTHESIZER

(76) Inventor: Robert Paul Johnson, 4840 W. Laurie La., Glendale, AZ (US) 85302

( * ) Notice: Subject to any disclaimer, the term of this patent is extended or adjusted under 35 U.S.C. 154(b) by 0 days.

(21) Appl. No.: 12/006,418

(22) Filed: Jan. 2, 2008

(65) Prior Publication Data

US 2008/0163621 A1 Jul. 10, 2008

Related U.S. Application Data

(60) Provisional application No. 60/879,096, filed on Jan. 8, 2007, provisional application No. 60/963,500, filed on Aug. 6, 2007.

(51) Int. Cl.
*F01K 13/00* (2006.01)
*C01B 3/36* (2006.01)
*C10J 3/46* (2006.01)
*C10J 3/54* (2006.01)

(52) U.S. Cl. ......................... 60/645; 48/197 R
(58) Field of Classification Search ............... 60/641.8, 60/641.9, 641.11, 641.12, 641.13, 641.14, 60/641.15
See application file for complete search history.

(56) References Cited

U.S. PATENT DOCUMENTS

| | | |
|---|---|---|
| 1,443,091 A | 1/1923 | Petersen |
| 2,668,099 A | 2/1954 | Cederquist |
| 2,960,314 A | 11/1960 | Bodine, Jr. |
| 3,180,762 A | 4/1965 | Oswin |
| 3,242,010 A | 3/1966 | Bodine |
| 3,291,643 A | 12/1966 | Oswin |
| 3,313,656 A | 4/1967 | Blomgren et al. |
| 3,409,471 A | 11/1968 | Sturm et al. |
| 3,436,271 A | 4/1969 | Cole et al. |
| 3,493,436 A | 2/1970 | Johnsen |
| 3,527,617 A | 9/1970 | Prober |
| 3,544,380 A | 12/1970 | Dey |
| 3,751,302 A | 8/1973 | Johnsen |
| 3,847,670 A | 11/1974 | Johnsen |
| 3,972,731 A | 8/1976 | Bloomfield et al. |

(Continued)

OTHER PUBLICATIONS

Ramsey Sleeper Architectural Graphic Standards, 7th Edition, Edited by Robert T. Packard, John Wiley & Sons, Inc., p. 96.
Robert W. Fox and Alan T. McDonald, Introduction to Fluid Mechanics, 5th Edition, John Wiley & Sons, Inc., p. 498.
Gilbert W. Castellan, Physical Chemistry, 3rd Edition, Benjamin/Cummings Publishing Company, Menlo Park, California, p. 70-71.
Gilbert W. Castellan, Physical Chemistry, 3rd Edition, Benjamin/Cummings Publishing Company, Menlo Park, California, p. 239.
CRC Handbook of Chemistry and Physics, 82nd Edition, CRC Press, p. 5-18.

(Continued)

*Primary Examiner*—Thomas E Denion
*Assistant Examiner*—Christopher Jetton

(57) ABSTRACT

A synchronous reaction cell, rotating as a unit, disassociates hydrogen from water, traps and filters hydrogen, mixes and pressurizes hydrogen and ingested carbon, hydrogenates carbon by surface catalysis, isolates and exhausts liquid hydrocarbon products above a desired density, recirculates gaseous products for further reaction, and expands steam through a turbine to produce rotation and turn an electrical generator. Solar energy focused by heliostats is one means of supplying process heat. Burning natural gas or another fossil fuel in oxygen freed by the disassociation of water provides alternative sources of heat. The reaction cell has a vertical axis-of-rotation making it conducive to mounting on a tower disposed at the center of an array of heliostats. The rotating reaction cell has a large, cylindrical heat-absorbing surface. Electrical output might be used to aim heliostats. Excess electrical generation might be added to the local electrical grid and sold for its value.

20 Claims, 19 Drawing Sheets

U.S. PATENT DOCUMENTS

| | | | |
|---|---|---|---|
| 3,976,507 | A | 8/1976 | Bloomfield |
| 4,001,041 | A | 1/1977 | Menard |
| 4,071,608 | A * | 1/1978 | Diggs ........................ 423/579 |
| 4,128,700 | A | 12/1978 | Sederquist |
| 4,303,494 | A | 12/1981 | Whitehurst et al. |
| 4,437,954 | A | 3/1984 | Sammelis et al. |
| 4,468,231 | A | 8/1984 | Bartok et al. |
| 4,491,624 | A | 1/1985 | Sarbacher et al. |
| 4,521,497 | A | 6/1985 | Tamminen |
| 4,551,155 | A | 11/1985 | Wood et al. |
| 4,684,585 | A | 8/1987 | Tamminen |
| 4,743,516 | A | 5/1988 | Noguchi et al. |
| 4,879,189 | A | 11/1989 | Snopkowski |
| 5,141,604 | A | 8/1992 | Ayers |
| 5,186,722 | A | 2/1993 | Cantrelli et al. |
| 5,409,784 | A | 4/1995 | Bromberg et al. |
| 5,614,332 | A | 3/1997 | Pavelle et al. |
| 5,678,647 | A | 10/1997 | Wolfe et al. |
| 5,709,961 | A | 1/1998 | Cisar et al. |
| 5,964,908 | A * | 10/1999 | Malina ..................... 48/197 R |
| 5,968,680 | A | 10/1999 | Wolfe et al. |
| 6,203,676 | B1 | 3/2001 | Phillips et al. |
| 6,213,234 | B1 | 4/2001 | Rosen et al. |
| 6,284,397 | B1 | 9/2001 | Barton |
| 6,312,843 | B1 | 11/2001 | Kimbara et al. |
| 6,338,912 | B1 | 1/2002 | Ban et al. |
| 6,379,828 | B1 | 4/2002 | Worth |
| 6,479,178 | B2 | 11/2002 | Barnett |
| 6,530,964 | B2 | 3/2003 | Langer et al. |
| 6,580,191 | B2 | 6/2003 | Lennox |
| 6,635,377 | B2 | 10/2003 | Hinokuma |
| 6,641,624 | B1 | 11/2003 | Govoni et al. |
| 6,656,616 | B2 | 12/2003 | Boneberg et al. |
| 6,756,893 | B1 | 4/2004 | Lee et al. |
| 6,730,424 | B1 | 5/2004 | He et al. |
| 6,759,153 | B1 | 7/2004 | Lamm et al. |
| 6,800,392 | B2 | 10/2004 | Jantsch et al. |
| 6,815,102 | B2 | 11/2004 | Bowman et al. |
| 6,854,602 | B2 | 2/2005 | Oyama et al. |
| 6,896,712 | B2 | 3/2005 | Gonda et al. |
| 6,884,528 | B2 | 4/2005 | Lee et al. |
| 6,887,609 | B2 | 5/2005 | Kaufmann |
| 6,896,988 | B2 | 5/2005 | Wang et al. |
| 6,899,744 | B2 | 5/2005 | Mundschau |
| 6,921,595 | B2 | 7/2005 | Clawson et al. |
| 6,986,802 | B2 | 1/2006 | Colling et al. |
| 7,005,204 | B2 | 2/2006 | Aoyagi et al. |

OTHER PUBLICATIONS

CRC Handbook of Chemistry and Physics, 82$^{nd}$ Edition, CRC Press, p. 4-22.
Lange's Handbook of Chemistry, 12$^{th}$ Edition, McGraw-Hill Book Company, p. 4-86.
George E. Dieter, Mechanical Metallurgy, 3$^{rd}$ Edition, McGraw-Hill, p. 490.
T. Schober and H. Wenzl, Topics in Applied Physics, Hydrogen in Metals II, Springer, p. 33, fig. 2.19.
Gilbert W. Castellan, Physical Chemistry, 3$^{rd}$ Edition, Benjamin/Cummings Publishing Company, Menlo Park, California, p. 751.
J. Vokl and G. Alefeld, Topics in Applied Physics, Hydrogen in Metals I, Springer, p. 325, fig. 12.2, p. 330, fig. 12.5.
Handbook of Chemistry and Physics, 82$^{nd}$ Edition, CRC Press, p. 5-50.
Fessenden and Fessenden, Organic Chemistry, 5$^{th}$ Edition, p. 441.
David Halliday, Robert Resnic and Jearl Walker, Fundamentals of Physics, 4$^{th}$ Edition, John Wiley & Sons, Inc., p. 169.
David Halliday, Robert Resnic and Jearl Walker, Fundamentals of Physics, 4$^{th}$ Edition, John Wiley & Sons, Inc., p. 453.
Ramsey Sleeper Architectural Graphic Standards, 7$^{th}$ Edition, Edited by Robert T. Packard, John Wiley & Sons, Inc., p. 96.
CRC Handbook of Chemistry and Physics, 82$^{nd}$ Edition, CRC Press, pp. 5-1,2,3 and 50.
CRC Handbook of Chemistry and Physics, 82$^{nd}$ Edition, CRC Press, pp. 5-89.
CRC Handbook of Chemistry and Physics, 82$^{nd}$ Edition, CRC Press, pp. 8-24.
M. Eisenberg, Fuel Cells, 1963, Edited by Will Mitchell, Jr., Academic Press, p. 53.
Gilbert W. Castellan, Physical Chemistry, 3$^{rd}$ Edition, Benjamin/Cummings Publishing Company, Menlo Park, California, p. 873.
Gilbert W. Castellan, Physical Chemistry, 3$^{rd}$ Edition, Benjamin/Cummings Publishing Company, Menlo Park, California, p. 781.
Handbook of Chemistry and Physics, 82$^{nd}$ Edition, CRC Press, pp. 5-96.
Gilbert W. Castellan, Physical Chemistry, 3$^{rd}$ Edition, Benjamin/Cummings Publishing Company, Menlo Park, California, p. 783.
George E. Dieter, Mechanical Metallurgy, 3$^{rd}$ Edition, McGraw-Hill, p. 490.
T. Schober and H. Wenzl, Topics in Applied Physics, Hydrogen in Metals II, Springer, p. 33, fig. 2.19.
J. Vokl and G. Alefeld, Topics in Applied Physics, Hydrogen in Metals I, Springer-Verlag, p. 325, fig. 12.2, p. 330, fig. 12.5.
McGraw-Hill Encyclopedia of Physics, 2$^{nd}$ Edition, McGraw-Hill, p. 1480.
McGraw-Hill Encyclopedia of Physics, 2$^{nd}$ Edition, McGraw-Hill, p. 1036.
David Halliday, Robert Resnic and Jearl Walker, Fundamentals of Physics, 4$^{th}$ Edition, John Wiley & Sons, Inc., p. 510.
McGraw-Hill Encyclopedia of Physics, 2$^{nd}$ Edition, McGraw-Hill, p. 1483.
CRC Handbook of Chemistry and Physics, 82$^{nd}$ Edition, CRC Press, pp. 9-75.
Gilbert W. Castellan, Physical Chemistry, 3$^{rd}$ Edition, Benjamin/Cummings Publishing Company, Menlo Park, California, p. 876.
William F. Smith, Foundations of Materials Science and Engineering, 2$^{nd}$ Edition, McGraw-Hill, p. 160.
J. Vokl and G. Alefeld, Topics in Applied Physics, Hydrogen in Metals I, Springer-Verlag, p. 325.
H. Wipf, Topics in Applied Physics, Hydrogen in Metals III, Springer, p. 56.
Robert W. Fox and Alan T. McDonald, Introduction to Fluid Mechanics, 5$^{th}$ Edition, John Wiley & Sons, Inc., p. 498.
Robert W. Fox and Alan T. McDonald, Introduction to Fluid Mechanics, 5$^{th}$ Edition, John Wiley & Sons, Inc., p. 724.
David Halliday, Robert Resnic and Jearl Walker, Fundamentals of Physics, 4$^{th}$ Edition, John Wiley & Sons, Inc., p. 881.
William F. Smith, Foundations of Materials Science and Engineering, 2$^{nd}$ Edition, McGraw-Hill, p. 328.
McGraw-Hill Encyclopedia of Physics, 2$^{nd}$ Edition, McGraw-Hill, p. 1034.
McGraw-Hill Encyclopedia of Physics, 2$^{nd}$ Edition, McGraw-Hill, p. 1037.
McGraw-Hill Encyclopedia of Physics, 2$^{nd}$ Edition, McGraw-Hill, p. 1036.
CRC Handbook of Chemistry and Physics, 82$^{nd}$ Edition, CRC Press, pp. 15-33.
CRC Handbook of Chemistry and Physics, 82$^{nd}$ Edition, CRC Press, pp. 13-15.
J. Vokl and G. Alefeld, Topics in Applied Physics, Hydrogen in Metals I, Springer-Verlag, p. 329.
Gilbert W. Castellan, Physical Chemistry, 3$^{rd}$ Edition, Benjamin/Cummings Publishing Company, Menlo Park, California, p. 21.
CRC Handbook of Chemistry and Physics, 82$^{nd}$ Edition, CRC Press, pp. 4-22.
CRC Handbook of Chemistry and Physics, 82$^{nd}$ Edition, CRC Press, pp. 12-46.
John Emsley, Nature's Building Blocks, Oxford University Press, p. 309.
E. Wicke and H. Brodowsky, Topics in Applied Physics, Hydrogen in Metals II, Springer-Verlag, p. 145, table 3.4.
John Emsley, Nature's Building Blocks, Oxford University Press, p. 187.

* cited by examiner

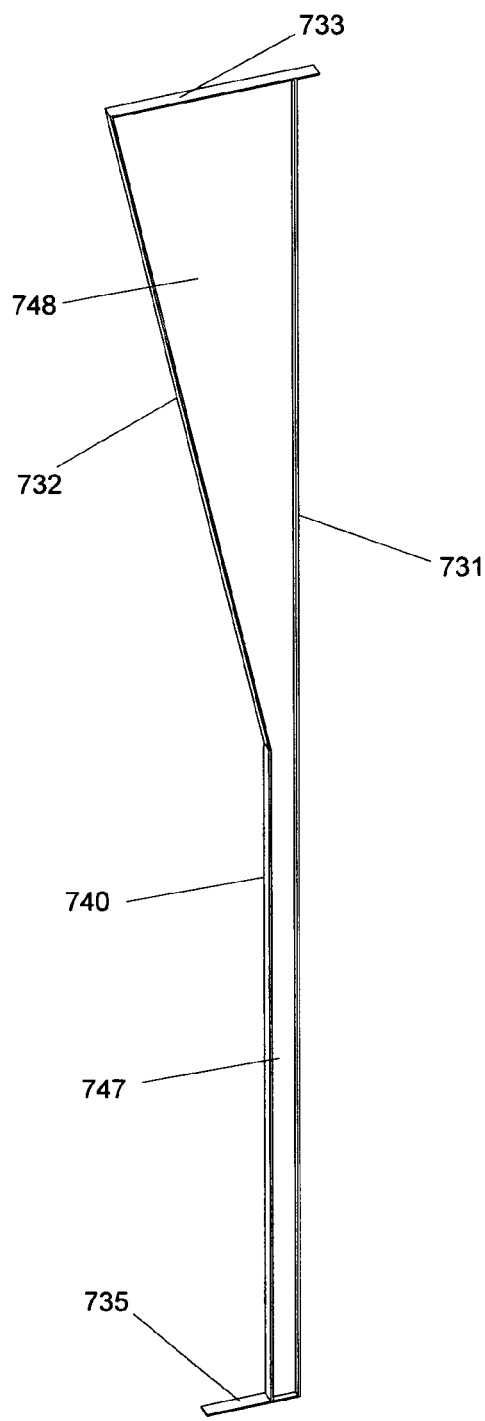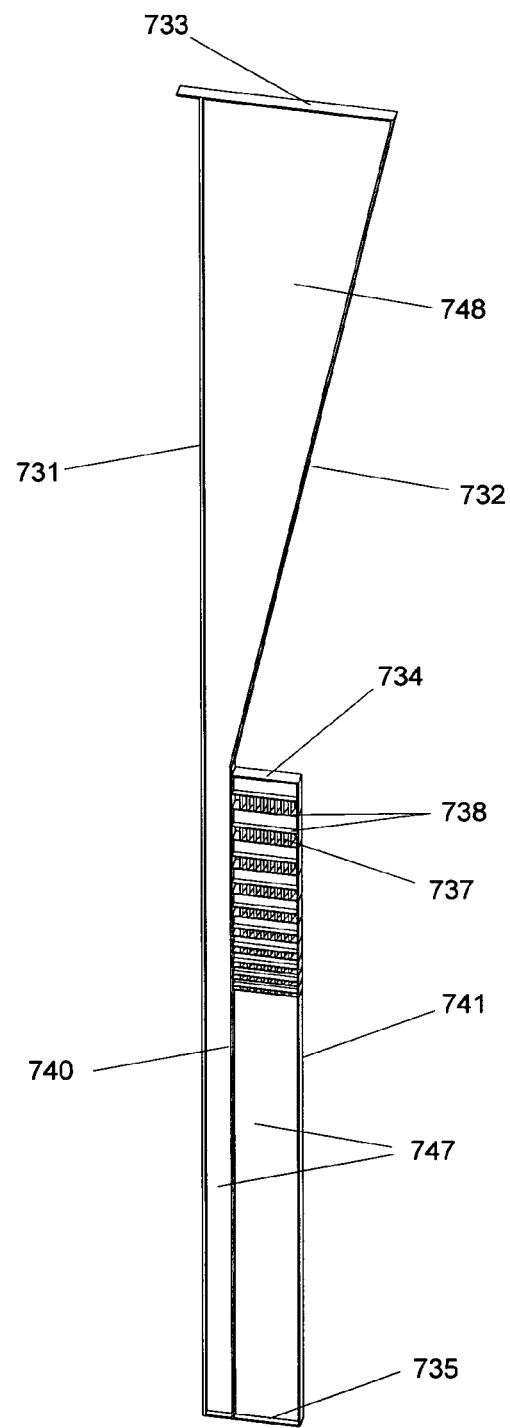
Fig. 18                    Fig. 19

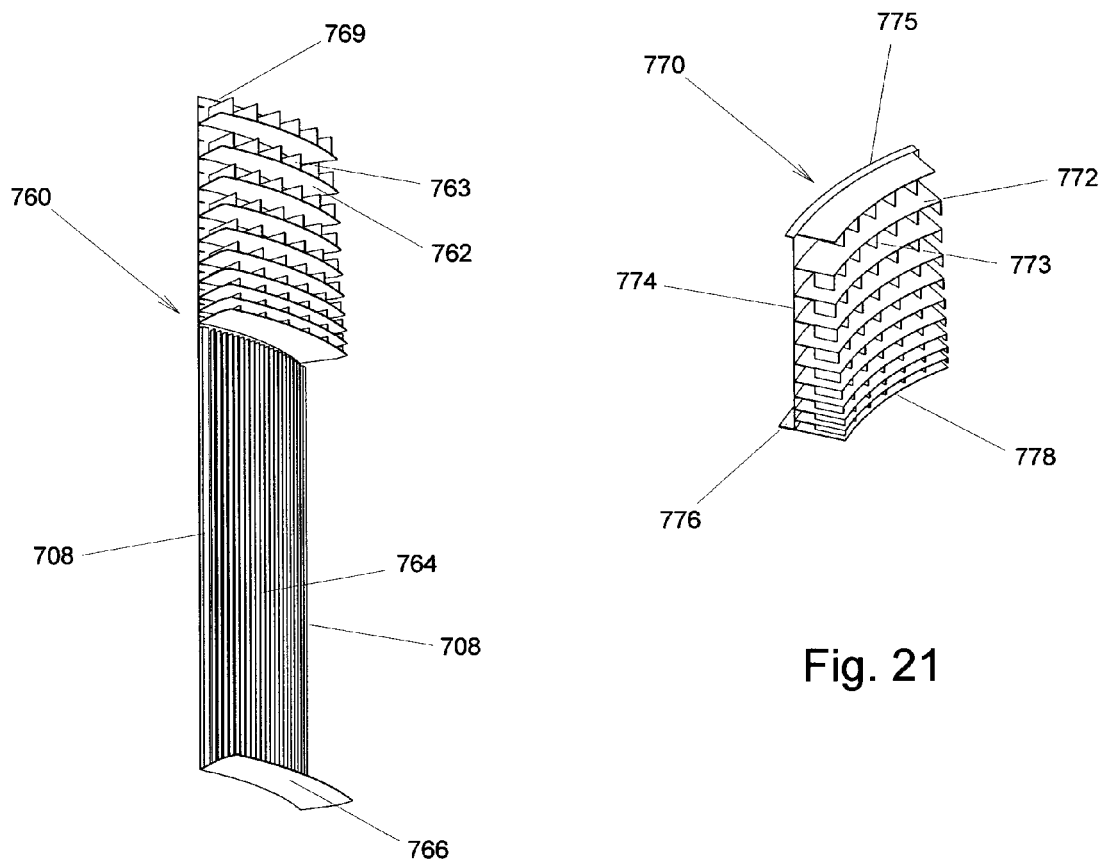
Fig. 21
Fig. 20
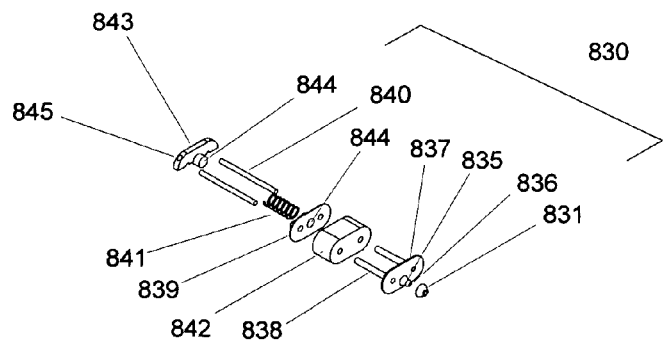
Fig. 22

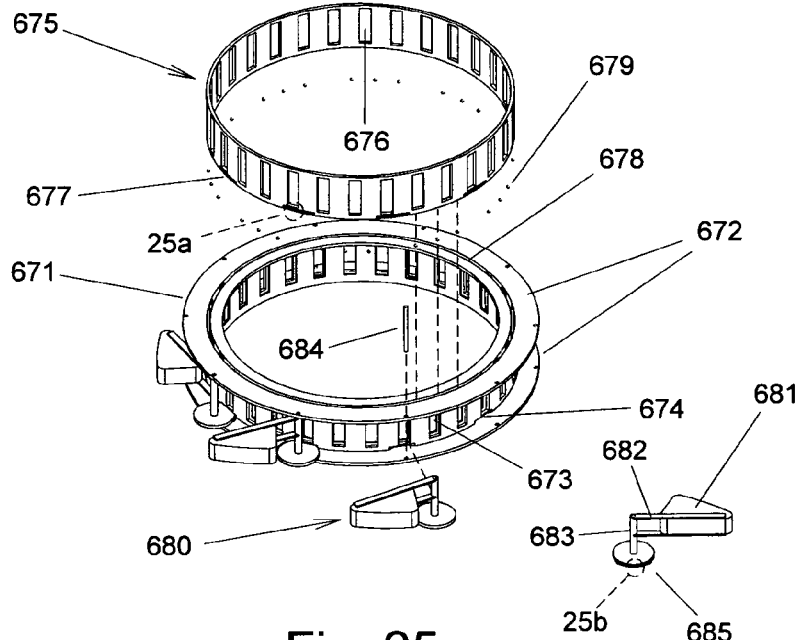
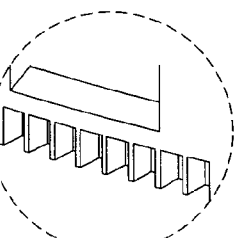
Fig. 25a
Fig. 25
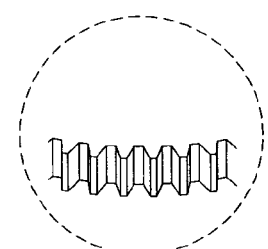
Fig. 25b
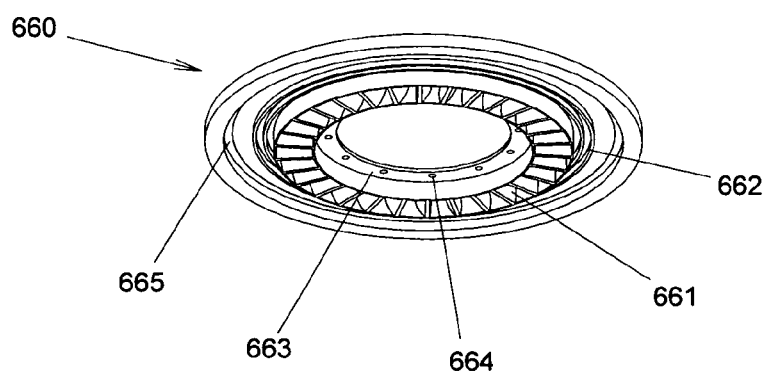
Fig. 26

SOLAR-POWERED, LIQUID-HYDROCARBON-FUEL SYNTHESIZER

CROSS-REFERENCE TO RELATED APPLICATIONS

This application claims priority of provisional patent application Ser. No. 60/879,096, filed Jan. 8, 2007, and benefits of a related provisional patent application, Ser. No. 60/963,500, filed Aug. 6, 2007.

FEDERALLY SPONSORED RESEARCH

Not Applicable

SEQUENCE LISTING

Not Applicable

BACKGROUND OF THE INVENTION

1. Field of Invention

This invention is a reaction cell for synthesizing hydrocarbons. Hydrogen gas wrung from water and carbon catalytically react in a cyclic flow in which liquid products are isolated from gaseous products. The reaction cell uses solar energy as one source of process heat.

2. Description of Prior Art

Hydrocarbons of various forms are used throughout the world to produce heat and work. Most hydrocarbon-fueled processes use atmospheric oxygen and exhaust reaction products into the air. Liquid hydrocarbon fuel is used extensively in transportation. Work is produced in the form of turning torque derived from the reaction of the fuel with air. Most liquid hydrocarbon fuel is refined from crude oil that is extracted from subterranean deposits. Extraction of oil deposits is becoming increasingly expensive. Transportation uses over half the oil deliveries. Other sources of liquid hydrocarbon fuels are commercial crops and naturally occurring grasses.

Great strides, including increased efficiencies, have been made in reducing pollution. Burning any hydrocarbon fuel in air produces carbon dioxide. Carbon dioxide is a greenhouse gas. Governments are beginning to treat manmade carbon-dioxide gas emissions as a climate-changing environmental concern, and social pressure to switch from present-day hydrocarbon fuels is growing. Solar, geothermal, wind and wave energy are non-polluting energy sources.

Fuel cells are an alternate means of producing work. Fuel cells rely on hydrogen gas as a fuel. Hydrogen gas is expensive to produce and pressurize. Most production of hydrogen gas involves the consumption of fossil fuels. Additional energy sources for hydrogen gas production are nuclear and solar. Nuclear energy produces nuclear waste. Solar uses photovoltaics for the electrolysis of water. The cost of photovoltaic panels is expensive, as the electron band gap is small and the resulting surface area is large. Hydrogen gas can be produced by thermally cracking the water molecule, but the gas must be separated and compressed. U.S. Pat. No. 6,756,893 B2[i] describes a process for sustaining disassociation by filtering hydrogen and oxygen from steam through electron-conducting solid membranes. Research has been done to make membranes that are highly permeable, thin, but strong and more cost effective. U.S. Pat. No. 6,899,744 B2[ii] describes a composite hydrogen transport membrane yielding $H_2$ permeation at 320° C. of 11 to 12 milliliters (STP) per minute per square centimeter, sustained over hours.

SUMMARY OF THE INVENTION

This invention asserts that the carbon atom is an ideal storage medium for hydrogen used as fuel. Unpressurized storage is part of the high utility of liquid hydrocarbon fuel. Liquid hydrocarbon fuel is the fuel of choice for transportation because it is easily contained and transported. The fuel tanks are unpressurized and lightweight. The device disclosed herein uses a heat and pressure-driven, cyclic process of building hydrocarbons, as opposed to mining and refining crude oil or growing bio-fuels. Water and carbon are the reactants. When solar energy is the heat source, liquid hydrocarbon fuel, oxygen, and electricity are the products.

The first objective of this invention is to produce liquid hydrocarbon fuel using abundant raw materials and solar energy. An alternate means of producing liquid hydrocarbon fuel might stabilize the cost of mined oil refined for the production of gasoline, and will ultimately reduce dependence on mined oil. Additional oil-refinery capacity becomes unnecessary. Capital for the addition or replacement of unneeded oil-refinery capacity can be directed toward solar-powered, liquid-hydrocarbon-fuel synthesizers.

A second objective of this invention is to use novel sources of carbon. The pumped-ion, electrochemical engine, disclosed in U.S. Provisional Patent Application Ser. No. 60/963,500, filed Aug. 6, 2007, recovers hydrogen-depleted carbon as a byproduct from liquid hydrocarbon fuel. The carbon byproduct of the fuel might become one such source of carbon.

A third objective is reducing pollution. Neither water that is used for water cracking, nor carbon that is used for hydrogenation are considered direct pollutants. The liquid fuel product is easily contained and transported, and pollutes only when leakage occurs. As solar-powered, liquid-hydrocarbon-fuel synthesizers replace oil refinery capacity, pollution-per-transportation-mile declines from lower oil refinery emissions. Considerable land area is required for heliostat arrays that provide process heat needed to synthesize liquid hydrocarbons. Arid, desolate desert land often has high insolation, which minimizes total land use, land-use competition, land cost, and fuel production cost. Environmental-impact, land-restoration-costs should be minimal. Lower ground surface temperatures might make desert land used for solar-powered synthesis more usable.

A last objective is combining the synthesis of hydrocarbon fuel with the production of electricity. Combining the synthesis of fuel with the production of electricity lowers the distributed facility cost, whether the principal product is hydrocarbon fuel or electricity. Heliostats focus solar energy onto the liquid-hydrocarbon-fuel synthesizer. The heliostats are turned by small electric motors. Electricity for the motors comes from a generator connected to a steam turbine driven by water heated by the concentrated solar energy. The size of the heliostat field is a function of the rate hydrogen permeates through a membrane surface. The membrane surface area is constant. Solar energy varies over the course of the day and the seasons. A heliostat array that produces sufficient hydrogen permeation during lower sun angles has excess capacity during higher sun angles. During peak hours, excess electricity is generated. Surplus generation is sold.

This invention is based upon two principal processes being combined into a single rotating device. Those processes are thermal cracking of water and synthesis of hydrocarbons. Water cracking is according to Maxwell's distribution of energy and the Le Chatelier principle. Focused insolation from surrounding heliostats or thermal energy produced from alternate sources, heats water. Disassociation of water into hydrogen and oxygen is endothermic. The temperature of heated water declines as hydrogen and oxygen disassociate. Additional energy replaces the endothermic cooling. Thermal equilibrium occurs at an elevated temperature where endothermic cooling equals the added heat flux. Steam from the heated water is expanded in a steam turbine that produces rotation. Rotation centrifuges the heated water, and concentrates and traps evolving hydrogen gas in membrane pockets. A shaft turns a generator that supplies electricity to steer the heliostats and power ancillary equipment, or sell into the electric grid. The hydrocarbon synthesizer ingests hydrogen gas that is wrung and filtered from the heated water and carbon. The reactants are mixed and pressurized in a centrifugal compressor. Condenser beds lie in the downstream flow of the mixed reactants. Multiple, cascading layers of screens in the condenser beds catalyze hydrogenation reactions. The inlet of a large centrifugal blower is downstream from the condenser beds in the process flow. Reduced pressure at the centrifugal blower inlet creates a pressure gradient across the cascading layers of the condenser beds. The pressure gradient and radial acceleration draw products out of the condenser beds and into an adjoining separator where the exiting products are centrifuged. Liquid hydrocarbon products are separated from gaseous products. Float valves allow accumulated liquid hydrocarbons above a desired density to exit the rotating device, while hydrogen and other lighter reaction products are recirculated through the synthesizer by the centrifugal blower and centrifugal compressor. Radial acceleration from rotation caused by the turbine drives the cyclic flow through the synthesizer.

The preferred embodiment operates in conjunction with a heliostat field that provides concentrated, reflected solar energy. An alternate embodiment might use natural gas and the oxygen disassociated from the heated water as a source of heat. Solar energy can be used to power the synthesizer during daylight hours and natural gas or another suitable fossil fuel can provide power at night. The combination of power sources extends the operating hours through the day and night and thereby lowers the distributed facility cost per unit-of-measure of liquid fuel produced by the synthesizer. Extending production through the entire day also reduces the total number of synthesizers needed, which lowers the need for metals used in the synthesizer. One objective of this invention is the reduction of pollution and greenhouse gases. While a level of carbon dioxide gas in the atmosphere must be maintained to avoid global cooling, a reduction from its present atmospheric content would be greatest if solar energy is the sole power source.

Heliostats of prior art are mentioned herein, but not described in design detail, except to note the approximate size of reflector panels and the focal point of the array. Each heliostat is equipped with a means of tracking the sun. At 33° North latitude, a ten-acre horizontal surface receives about 10,100 Btu per second of solar energy at 9 a.m. on the winter solstice. The same area receives 30,600 Btu per second at 12 noon on the summer solstice[iii]. A design objective for this invention was to create a reaction cell that can be produced at an economical price. Desert land is usually inexpensive. The heliostat array is likely one of the highest facility cost.

The embodiment described in this application assumes a heptane and octane blended output of 0.58 liters per second, using about 360 m² of hydrogen permeable membrane surface. That requires a H₂ permeation rate of about 12 mL (STP) per minute per square centimeter at 300° C. and an operating pressure near 85 bar or 1,245 psi. A lower permeation rate will require a larger membrane surface for the same output. Assuming pure water and graphite are the raw materials, the idealized reactions are

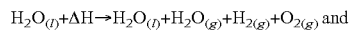

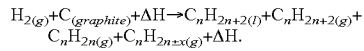

Methane, acetylene, and ethylene are the likely first products. The light gases are recirculated through the synthesizer to further react and produce longer alkanes. Energy to drive the cyclic hydrogenation reactions and operate the steam turbine is described in thermodynamic terms of enthalpy, where $H=U+pV$ and $W=Q-\Delta U$. H is enthalpy, U is internal energy, pV is a product of pressure and volume, and W is work. Energy comes from the transfer of heat, Q.

Water and carbon enter at the top of the synthesizer. The solar-powered synthesizer sits atop a tower disposed at the center of an array of heliostats. Reactants are raised from the base of the tower to the synthesizer. Changing elevation requires work equal to the change in potential energy, where $E_p=mg\Delta h$, and m is mass, g is gravitational acceleration and h is height.

Water fills a storage tank at the base of the tower. Some water is recirculated through the steam turbine. A secondary water reservoir is disposed at the base of the synthesizer, at the top of the tower. The secondary water reservoir captures condensate from the steam turbine. Only makeup water need be raised the full height of the tower. An inlet screw, turning at the angular speed of the device, lifts water from the secondary reservoir to the top of the device, where it enters horizontally oriented water-injection channels. Imparting kinetic energy in the direction normal to the horizontal cross-sectional area of the inlet pipe, and equal to the sum of the potential energy change and viscous drag of the flow, produces sufficient head to raise the water. In the illustrated embodiment, water is raised about 11.5 meters above the secondary reservoir. Operating at an angular speed of 630 revolutions per minute, the inlet screw impeller blades have an operating radius of about 0.2 meters. At the top of the device, water is accelerated radially outward through water-injection channels. Changing angular momentum requires shaft torque and work that is governed by the Euler turbomachine equation for steady flow, where the rate of mechanical work is given by $W=\omega(r_2 V_{t2}-r_1 V_{t1})$ (mass flow)[iv]. W is the rate of work, ω is angular velocity, r is radius, and $V_t$ is tangential velocity. Angular speed adds sufficient rotational kinetic energy to the inlet flow to raise the inlet pressure, at the outer radius, above the vapor pressure of water within an adjoining water heater and centrifuge. For a rotating, cylindrical or cylindrical-shell volume, pressure at the outer radius is given by, $p=\frac{1}{2}\rho(\omega r)^2(1-r_i^2/r^2)$ where ρ is density. Finite pressure at the outer radius, r, decreases as the inner radius, $r_i$, approaches the outer radius and the cylindrical shell becomes thin. At the operating angular speed, pressure at the outer radius of the water-injection channels, far exceeds the head pressure needed to lift water from the secondary basin to the inlet. A pump transfers water from primary storage to the secondary, pumping reservoir. Water injection theoretically consumes about 24.0 kilowatts.

Carbon is lifted from an intake feed disposed above the secondary water reservoir. The feed rate depends on the stoichiometric ratio to hydrogen for the alkane produced; e.g., seven carbon atoms for sixteen hydrogen atoms entering the synthesizer for heptane. The approximate volume of carbon to water is about one to four. A screw auger lifts carbon to near the top of the rotating structure, where it is swept outward to passages leading downward into the hydrocarbon synthesizer. A stationary vertical pipe encloses the auger. The helical auger blade is affixed to a strong and rigid, axle pipe. Water entering the synthesizer flows upward through this pipe. The screw impeller that lifts water is attached at the lower end of the axle pipe, thus combining the water and carbon lifting. Carbon injection theoretically consumes about 1.7 kilowatts.

Three distinct regions make up the water-cracking system: Cool water enters through water-injection channels. Water is heated and hydrogen gas is wrung from the water in a water heater and centrifuge. Lastly, heated water is channeled from the water heater and centrifuge through a circular plenum to a steam turbine that produces rotation. The function of the water-injection channels is to push water through the system while preventing a back flow of steam. Pressure inside the inlet channels is a function of the radial depth of the fluid and angular speed, and is exerted radially and laterally. Water flows downward from the injection channels into a water distribution ring before entering the water heater and centrifuge. The distribution ring balances the inflow entering the water heater and centrifuge. A small, 0.006 $m^2$ cross-sectional area of the inlet channels raises the velocity of the water to limit heating that occurs as the inflow travels downward through closed channels that pass through the water heater and centrifuge. Pressure inside the downward channels of the inlets exceeds the increasing vapor pressure of the inflow, as the water is first heated before reaching the water distribution ring.

The purpose of the water heater and centrifuge is to disassociate hydrogen gas from heated water, wring the gas from the liquid with extreme buoyancy, and collect the hot gas within membrane pockets where it is selectively filtered. Steam for a steam turbine is produced in the water heater and centrifuge. The velocity of the volume-flow through the water heater and centrifuge slows allowing the water to be heated to high temperature. The water heater and centrifuge has an internal volume of about 0.640 cubic meters. An inflow of 0.79 liters of water per second for steam and 0.57 liters per second for water cracking yields a flow-through heating duration of 470 seconds, using a first-in-first-out flow. Initial heating is longer, as it includes water in the turbine inlet plenum and the water distribution ring. Those regions add a volume of about 0.542 $m^3$. A total water mass of about 1,195 kilograms or 2,635 pounds is held within the water cracking system. Changing the water capacity changes the heating period. Stubby, radial vanes emanate inward from the outer containment wall of the water heater and centrifuge. The vanes increase the surface area of heat-exchanger metal in contact with water to about 48.6 $m^2$. The vanes accelerate water in the centrifuge. Limiting the inner-radius surface of centrifuged water to a radius greater than the membranes keeps liquid out of the membrane pockets. Liquid in the membrane pockets reduces the membrane surface area exposed to hydrogen gas.

Focused solar energy heats water in the water heater and centrifuge. Other sources of heat including heat that is derived from natural gas or other fossil fuel burners might be used in conjunction with or as an alternative to solar energy. As the water temperature rises inside the water heater and centrifuge, a number of water molecules will disassociate into hydrogen and oxygen molecules. The number of water molecules having sufficient energy to disassociate is predicted by the Maxwell distribution of energy, where $N(\epsilon) = 2(\epsilon/\pi kT)^{1/2} e^{-\epsilon/kT} N$ when $\epsilon \gg kT$[v]. $N(\epsilon)/N$ is the fraction of molecules of a given volume having energy, $\epsilon$, in joules per molecule, where k is the Boltzmann constant, and T is the absolute temperature. As the water temperature rises, the equilibrium constant, $K_p$, increases, predicting an increase in reaction products. Endothermic disassociation of water molecules counteracts the rise in temperature, which is consistent with the Le Chatelier's principle[vi]. An equilibrium temperature is reached when endothermic cooling and venting equals the solar or other heat influx.

Energy needed to disassociate a water molecule into its constituent elements is high: 285.8 kJ/mol[vii]. Molecules of a given volume having the requisite energy is small even at elevated temperatures. At 573.15 degrees Kelvin, 640 kilograms of water has about $2.78 \times 10^{-21}$ moles with sufficient energy to disassociate. To collect the hydrogen product, high acceleration within the centrifuge drives hydrogen molecules radially inward as new water molecules are energized by heat transfer at the outer wall of the water heater. The water heater rotates and centrifuges water contained therein. At a radius of about 2 meters and an angular speed of about 630 revolutions per minute, the average radial acceleration inside the water heater and centrifuge is 8,663 m $s^{-2}$, or about 883 times gravitational acceleration on earth. Extreme buoyancy rapidly drives light $H_2$ molecules radially inward to where the hydrogen is filtered through membranes. Thermal energy is added to the water at the rate of hydrogen production that occurs at the equilibrium temperature. This is above the energy added to the water to turn the steam turbine that turns the centrifuge. A disassociation rate of 0.58 liters per second requires 9,111 kilowatts of energy. Initially the hydrogen flow is small, but increases with temperature until the equilibrium temperature is reached. At equilibrium, a flow of 31.89 moles per second of $H_2$ gas is driven to the interior, membrane pockets, which bound the water heater and centrifuge at the inner radius. Hydrogen gas appearing at the membrane equals hydrogen gas forming at the outer radius, interior wall of the water heater and centrifuge, yielding a continuous pipeline flow of the gas.

Design parameters depend upon the equilibrium temperature, which depends on the amount of added energy. At 300° C., water has a vapor pressure of 85.838 bar, or 1,245 pounds per square inch. At a radius of 2 meters, an angular speed of 630 rpm raises the inlet water pressure to over 1,245 psi. If the equilibrium temperature is lower, then the angular speed might be lower. At 374° C. and 220.2 bar, water is at the critical temperature and pressure, and behaves strangely. Endothermic disassociation and venting should prevent the equilibrium temperature from exceeding 300° C. The walls of the water heater and centrifuge must tolerate the high temperature and vapor pressure of the heated water. The outer wall must be an excellent heat conductor, which softens well above the equilibrium temperature. Radial pressure from the thin, cylindrical shell of water in the water heater and centrifuge is only about 165 kN $m^{-2}$ or 24 psi.

Hydrogen gas diffuses through a membrane. The membrane wall, at the inner radius of the water heater and centrifuge, is selectively permeable to hydrogen. Hydrogen readily diffuses through heated palladium[viii]. Palladium melts at 1,554.9° C., far above the equilibrium temperature where disassociation of water molecules occurs. Palladium is a fcc crystal[ix]. Palladium is known to filter hydrogen from other gases. Palladium is expensive. A lower-cost membrane should be used to strengthen a thin layer of the expensive metal. Vanadium and niobium are both lower cost metals. Hydrogen diffuses through vanadium and niobium at higher rates than palladium. Vanadium melts at 1,910° C., and niobium melts at 2,477° C. Palladium must clad the vanadium or niobium because the latter do not filter oxygen, which is also present when water disassociates to oxygen and hydrogen.

There is a risk of hydrogen embrittlement in most bcc and hcp metals[x]. Both vanadium and niobium have a bcc crystalline structure. The hydrogen concentration must be controlled in the substrate metals, which can absorb large volumes of the gas. Metal hydrides precipitate with lowering temperature, causing structural failure. Near room temperature, the hydrogen concentration at the solubility limit of the α phase is between $10^{-2}$ and $10^{-1}$ [xi]. At the end of the day, heat flux into the water decreases with decreasing solar irradiation. Water molecules having the energy to disassociate declines, as do the number of hydrogen molecules appearing at the membrane surface. A decrease in temperature from 300 to 200° C. results in a decline in orders of magnitude of six in the number of water molecules having the energy to disassociate and produce hydrogen gas. That is, molecules having sufficient energy declines by 99.99966%. At the same time, interstitial mobility decreases only slightly. Vapor pressure in the water heater and centrifuge decreases 53.7% to 39.7 bar or 576.3 psi. At the lower temperature, the outflow of hydrogen from the membrane should exceed the inflow. Cool down occurs over an extended period. As endothermic cooling is removed from the water process, the temperature drops more slowly. At the reduced temperature, almost all heat that is transferred to the water will be for the production of steam for the steam turbine, which maintains rotation and generates electricity.

Managing the economics of the membrane is important. The cost of membrane materials is the high. Production in the hydrocarbon synthesizer depends on the amount of hydrogen gas that permeates through the membrane, so the membrane determines operating capacity. From prior art, a sustained hydrogen permeation rate between 11 to 12 mL (STP) per minute per $cm^2$ at 320° C. is possible. That is about 8,065 hydrogen gas molecules per second per crystal cube face in the membrane surface. In human terms, that is a large number. In molecular terms, it is small. A single gas molecule at atmospheric pressure and 25° C. collides about 4 billion times per second[xii]. At the sustained permeation rate of prior art, the synthesizer disclosed in the illustrated embodiment is estimated to require a membrane surface area of about 360 $m^2$ to achieve a fuel production rate of about 0.58 liters per second. More can be added.

To provide a large surface area, the membrane wall is a stacked array of annular discs. The axis-of-rotation passes through the axial centers of the stacked discs, and the membrane surfaces are parallel or nearly parallel to each other. Pairs of the membrane discs are joined at the inner radii to a third, non-membrane disc interposed between the membrane discs. Vanes emanate from the upper and lower horizontal surfaces of the third disc. The elevated surfaces of the vanes abut the opposing surfaces of the joined membrane pair. The vanes rise only a small elevation from the upper and lower surfaces of the third disc. The small elevation change yields narrow voids between the otherwise flat surfaces of the third disc and the surfaces of the adjacent membrane discs. The narrow voids terminate at an inner radius where the third disc has an annular ring having the same elevation as the emanating vanes. The two membrane discs are joined through this annular, inner-radius ring. Fluids enter the resulting membrane pockets through openings between the vanes that are arrayed around the circumference of the stacked array. A stacked array of 58 pairs of annular membrane discs yields a combined surface area of about 358 $m^2$. Disassociated hydrogen gas migrates from the outer radius of the water heater and centrifuge in the direction of the buoyant force. At 630 revolutions per minute, the buoyant force vector is about 0.065 degrees above the horizontal and radially inward toward the stack. The vertical component is for gravity. As hydrogen gas appears at the circumference of the stacked membrane pairs, it moves upward. When the gas moves vertically across an opening into a membrane pocket, buoyancy drives the gas inward between the vanes where it is trapped.

Hydrogen-selective membranes are well developed in prior art. The membrane discs operate under high, radial acceleration acting in the plane of the annular disc, and high pressure that is normal to the membrane surface. To minimize costs, the membrane is a composite structure. Vanadium or niobium metal is outgassed before being clad with palladium. A thin foil of niobium, vanadium or an alloy thereof clad with a thin layer of palladium, is backed by a porous and lower-cost, structural metal that might in turn be supported by a high-strength, felted metal. The backing materials provide a membrane foundation having high strength. The backing materials are disposed on the hydrocarbon-synthesizer side of the membrane. The composite membrane spans a pressure-resisting structure, such as honeycomb webbing that rigidly joins inner- and outer-radius, framing rings that secure the composite membrane at the circular perimeters. The inner- and outer-radius annular frames allow rugged, flanged joints for securing the membrane disc. When heated, the inner-radius annular frame does not expand at the same rate as the outer-radius frame, thereby adding tensile-stress across the surface of the membrane. Tensile stress across the membrane increases the rate of hydrogen permeation through the membrane by increasing lattice bond lengths in the radial plane of the membrane disc.

A fourth annular disc is interposed between adjacent, joined membrane pairs. Small-elevation vanes emanate from both horizontal surfaces of the fourth disc and abut the inner-radius annular frames of two membrane discs, thereby vertically ensconcing all inner-radius annular frames of the stacked array of membrane discs. The vanes originate from an annular ring having the same elevation of the emanating vanes and the radii of the outer-radius annular frame of the membrane disc. The vanes angle so that the inner-radius termini of the vanes trail their points of origin from the annular ring, relative to rotation. The vanes vent hydrogen exiting the membranes into the hydrocarbon synthesizer. The secured joint between the outer-radius annular frame of the membrane discs and the annular ring of the fourth disc is watertight and rigid.

Heated water exits the water heater and centrifuge and flows upward into a washer-shaped void that leads to a steam turbine inlet. Vanes, disposed in a circular array on each side of passages into this inlet plenum, extend the adjacent centrifuge upward into the plenum cavity. The vanes regulate the radial, liquid depth inside the water heater and centrifuge by maintaining pressure from radial acceleration across the passages between the water heater and centrifuge, and the inlet plenum. The vanes of the inlet plenum extend radially inward. Liquid inside the plenum void that is at a smaller radius than the inlet vanes is not radially accelerated except for acceleration caused by friction and viscosity. Pressure from the vanes establish a liquid-gas interface at the outer radius of the membrane discs. At an inner-radius, the plenum vane blades turn to a direction that is nearly opposite the direction of rotation. The trailing end of the vanes is at a smaller radius from the axis-of-rotation than the point where the vanes turned. The trailing termini of each vane blade overlaps the adjacent, trailing vane blade. The turned vane blades push fluid volumes greater than the volume disposed between the vanes, radially inward toward the steam turbine inlet. Viscous acceleration inside the plenum is countered by the turned vanes. Plenum impellers disposed at a smaller radius also produce an inward flow to the turbine inlet. A valve mechanism controls flow into the steam turbine. The valve opens when liquid is present near the turbine inlet. Gears rotate an annular gate valve. A circular array of floats rotate gears that turn the annular gate valve. The annular gate valve prevents unthrottled steam from explosively escaping and thereby emptying the water heater and centrifuge of liquid therein.

Pressure produced by the water injection equals the vapor pressure of water heated to 300° C. The cross-sectional area at the lower end of the downward channels of the inlet is about 0.006 m². The area of the openings into the gas-trapping membrane pockets is about 1.43 m². Cool water injection produces a distributed gage pressure of about 0.355 bar or 5 psi that acts inward into the membrane pockets. A three-meter, vertical water column adds about 0.276 bar of pressure at the lowest membrane pocket. At 630 rpm, acceleration of water inside the pockets produces a pressure of 21.45 bar or 311 psi opposing the inward pressure at the openings into the membrane pockets. Water flushes outward from the membrane pockets and an equal volume of water is pushed into the turbine inlet plenum. As heated water flushes outward, a gaseous mixture including hydrogen and steam fills the gas-trapping membrane pockets.

Hydrogen permeation depends on the diffusive force and the interstitial mean-time-of-stay. Diffusion is driven by the vapor pressure and high temperature at the membrane surface. The interstitial mean-time-of-stay is short; in the range from 25 to 75° C., the mean-time-of-stay is graphically shown to be about $1 \times 10^{-9}$ s in palladium and $1 \times 10^{-11}$ s in niobium[xiii] and decreases at higher temperature. Vapor pressure inside the gas-trapping membrane pockets is about 85.8 bar or 1,245 psi and acts in all directions including toward the liquid/gas interface at the inlets into the membrane pockets. Acceleration of water molecules in the centrifuge and water vapor inside the membrane pockets push radially outward, and establish a lower equilibrium pressure. For a given temperature and angular speed, the vanes inside the membrane pockets fix the gas pressure at the membrane surface. Kinetic energy of the gaseous mixture and vane-induced, intra-pocket convection keeps hydrogen dispersed across the membrane surface. Pressure that is normal to the membrane surface and thermal expansion produces strain across the membrane.

To aid absorption into the metal membranes, a surface bias might be induced. Metal electrode discs that are electrically insulated from the membranes induce a bias. A positively biased, electrode is embedded in the third disc disposed between joined membrane pairs. The third disc is made of an insulating material that electrically isolates the embedded electrode. A negatively biased electrode is embedded in insulating material of the fourth disc disposed between adjacent sets of joined membrane pairs. Charge is applied to the electrodes. Electric field lines pass through the metallic membrane. Conduction electrons in the membrane are attracted to the positively charged electrode. A negative potential appears at the membrane surfaces that abut the vanes of the third disc. Hydrogen is favorably absorbed into negatively biased, membrane surfaces. Alternatively, a positive potential appears on the opposing surfaces of the membranes. Hydrogen gas is exhausted into the hydrocarbon synthesizer from this side of the membranes. The charged electrodes are capacitor discs. Charging of the capacitor is a startup process. From Gauss' law, charge, q, equals $\epsilon_o E A$, where $\epsilon_o$ is the permittivity constant, E is the electric field, and A is the area of the capacitor. The area equals $(r_1^2 - r_2^2)\pi$. Rearranging terms, $\Delta V/m$ equals $ne^-/(\pi \epsilon_o (r_1^2 - r_2^2))$, where $\Delta V/m$ is the electric field, and n is the number of elementary charges, $e^-$, transferred between the plates. Membrane separation from the positive electrode plate is about 0.005 meters. The potential for optimal hydrogen absorption at the temperature and pressure inside the gas-trapping membrane pockets must be determined. The unknown is the voltage, V. Voltage is adjusted by adding or removing elementary charges to or from the metal electrodes. The potential between adjacent electrode plates is increased until the electric field strength at the surface of the membrane equals the potential that yields optimal hydrogen adsorption, which should be small. Charging time can be adjusted. Leakage of charge from the electrodes might occur and require restoring charges. If membrane bias is used to enhance absorption, the insulating materials covering the biasing electrodes must withstand the high temperature and pressure present at the inner radius of the water heater and centrifuge.

Hydrogen immerging from the inner-radius of the membrane wall is vented into the gas inlet of the hydrocarbon synthesizer where it mixes with light hydrocarbon gases. The inlet chamber is an open cavity bounded at the outer radius by the encircling membrane wall. The chamber is closed at the top by the turbine inlet plenum and at the bottom by a lower disc. Large blower impellers at the inner radius of the inlet cavity recirculate gases. The gas inlet mixture is drawn into a multistage centrifugal compressor where it is mixed with carbon. Carbon is injected into the compressor by radial acceleration, gravity, and gaseous flow at the compressor inlet.

The Euler turbomachine equation predicts the work to move the reactants through the compressor. The illustrative embodiment has 10 compressor stages. The mixed flow exits the last compressor stage and enters condenser beds where carbon particles are trapped on screens. The screen area is normal to the radial flow of reactants passing through the condenser beds. Carbon particles are held in vertical suspension against the metallic screens. Hydrogen and light hydrocarbon gases pass through the suspended carbon particles and other heavier hydrocarbon products. Hydrogen and carbon reactions are exothermic, and range from −78.6 kJ per mole for methane to −250.1 kJ mol$^{-1}$ for octane. Enthalpy from the formation of a liter of heptane each second is 6.82 kJ, or 6.47 Btu per second[xiv]. The reaction rate is slow. Unlike oxygen, which readily mixes with hydrogen gas, carbon graphite is normally a solid and carbon pi-bonding is more complicated, so the reactions are slower. Suspension of carbon particles in the gaseous flow improves mixing. Ten compressor stages theoretically require about 160 kilowatts of work to move and pressurize the reactant mix. Heat and pressure alone might not produce the desired reactions. Surface catalysis has been used in prior art.

Platinum-group fixing catalysts, such as rhodium, are used to catalyze hydrogenation reactions. Rhodium is believed to temporarily bond with $H_2$ gas and disassociate the sigma bonds of the molecule. The M:H bond holds the separated hydrogen atoms until they further react and are released. Alkenes are similarly adsorbed onto the metal surface, breaking their pi bonds. They then collide with the M:H bonded hydrogen to release an alkane from the surface[xv]. Surface catalyzed hydrogenation produces predominately one-sided syn addition. Partially deactivated palladium acts to change alkynes to alkenes by single atom addition. Surface catalysts are added to the screens of the condenser bed. Energy released by hydrogenation heats the condenser screens, which activates subsequent reactions. Hydrogenation is a slow, surface process, so an essential design element was to increase the opportunities for favorable reactions. This objective is answered by creating a large catalyzing surface in a small volume of space. The condenser bed screens are arranged in cascading layers in the radial direction. The perforations, mesh or porosity of the screens is progressively smaller in outer layers, which maintains a desired pressure within the condenser beds. As larger carbon particles erode in the gas flow, smaller particles are trapped in downstream screen layers. The layers are concentric around the axis-of-rotation. Each condenser bed is conceptually drawn with 30 cascading layers of screens. Each screen layer has an aggregate average exposed surface area of about 10.0 m² normal to the flow. Each screen layer is separated by about five millimeters in the illustrative embodiment. The total screen surface exposed to the flow is about 300 m². The total surface area can be sized as needed by adding screen layers or adding height to the condenser beds.

Light gases recirculate through the condenser beds. Recirculation has the effect of adding multiples of the screen layers. Gas recirculation of 170 times, or 10 cycles for each hydrogen atom of an average heptane and octane product, passes 5,100 layers of catalyzing surface. Gas flow through trapped carbon solids first produces methane, acetylene, and ethylene gases. Light hydrocarbon gases and hydrogen gas pass through the condenser beds repeatedly. The hydrocarbons grow as they react with hydrogen, carbon, or other hydrocarbon molecules. The cyclic process leads to an equilibrium population of various hydrocarbons in the condensers. Larger molecules move more slowly. A 0.58 liter, liquid volume distributed over the surface area of the condenser beds has a combined radial depth of 58 microns. As normally liquid hydrocarbons form, light and fast hydrocarbon gases percolate through and react with the slower moving liquid wetting the catalytic surfaces. Pressure produces addition-type reactions. When the condenser beds are saturated with liquid product, the reaction rate should reach a sustained equilibrium. The condenser flow theoretically consumes about 19 kilowatts. The pattern of catalytic layers and porosity-regulated pressure through the condenser beds can be adjusted to optimize empirically measured output. An optimum pattern is not claimed.

When the hydrocarbon molecules become heavy enough to condense as liquids, they are mechanically separated from the lighter gases in a liquid-gas-separating centrifuge. Timely separation of the heavier hydrocarbons avoids the formation of long polymer chains that could ultimately clog the condenser beds. Products exiting the condenser bed flow into the centrifuge. The centrifuge rotates at the same angular speed as the water heater and centrifuge, and the multistage compressor. Fuel floats in the liquid-gas-separating centrifuge regulate the outlets of the hydrocarbon synthesizer. The floats have conical plugs at their outer radii. The plugs seat in valve seats that are circularly arrayed around the outer-radius wall of the liquid-gas-separating centrifuge. The valve seats surround exhaust ports that penetrate through the outer wall of the centrifuge. Springs hold the valve plugs against the valve seats when the centrifuge is not turning. The force exerted by the springs is given by Hooke's law, which describes spring force as $F=-k\,x$, where k is the spring constant and x is the displacement of the spring[xvi]. Density normally increases with the increasing size of alkanes. Heptane is 4.4% denser than hexane and 9.2% denser than pentane. Hydrocarbons smaller than pentane are normally gases, and the high vapor pressure of pentane, and to a lesser extent hexane, allows both hydrocarbons to become gaseous in low-pressure environments. Heptane displaces hexane and liquid pentane under radial acceleration in the liquid-gas-separating centrifuge. The floats open the outlet valves only when denser heptane or octane accumulate and lift the plugs off the valve seats by buoyancy according to Archimedes' principle[xvii]. The buoyant force that raises the float must exceed the forces holding the float valve closed. The spring constant, k, must be less than the difference in buoyant forces divided by the displacement, or $k<|\rho_{heptane}-\rho_{float}|(V)\,(a_r)/|x_2-x_1|$. V is the volume of fuel displaced by the float, $a_r$ is the radial acceleration in the centrifuge as it turns, and $x_2-x_1$ is the radial distance that the float must be displaced to permit adequate flow through the exhaust ports. At the same time, the forces holding the float valve closed must be greater than the buoyant force produced by hexane, so $k>|\rho_{hexane}-\rho_{float}|(V)\,(a_r)/|x_2-x_1|$.

Lighter hydrocarbon gases are drawn out of the liquid-gas-separating centrifuge by a centrifugal blower. The inlet to this fan is at the upper, inner radius of the liquid-gas-separating, centrifuge tub. Gases entering the blower are exhausted into the gas inlet of the hydrocarbon synthesizer. The blower and multistage compressor recirculate gases through the condenser beds. Cyclic flow increases the number of times gas flows through each catalyzing layer of the condenser beds. Together, the compressor and blower create a pressure gradient across the condenser bed, which draws the pressurized mixed flow through the condenser bed and into the liquid-gas-separating centrifuge. Theoretically, about 42 kilowatts is needed to move the average mixture of gases through the recirculating blower.

A steam turbine provides rotation of the device and turns a generator that powers the altitude and azimuth drive motors of the heliostat array, and other ancillary equipment. The steam turbine is disposed in the hollow axial-center of the recirculation blower, and the integrated water pipe and carbon auger extends through the axial center of the steam turbine. The turbine is a multistage, axial-flow turbine having a vertical axis-of-rotation. The illustrative embodiment has six stages, but that can be changed according to need. The turbine inlet is at the top, and the turbine exhaust is at the bottom. Vapor pressure at the inlet is nearly 85.8 bar or 1,245 psi. The turbine rotor turns on a vertical, fixed pedestal. It is enclosed by a stationary, cylindrical-shell that supports stator clamshells and an upper main bearing. High inlet pressure and the vertical orientation reduce the rotating weight supported by bearings. The turbine cross-sectional area is about 0.447 m², or 693.9 in². Heavy components capable of withstanding high forces can be used to manufacture the rotating assembly. A large, main bearing at the base of the stationary turbine housing is vertically confined to prevent the rotating assembly from rising and shearing the turbine vanes. Rotor vanes emanate radially outward from hollow axle shaft having a outer radius of 0.4 meters, to a radius of about 0.55 meters. Stator vanes emanate radially inward from the interior walls of the clamshell sections disposed on the stationary housing surrounding the rotor pedestal.

The steam-turbine capacity is estimated using a typical turbine and generator, vapor-cycle output efficiency. Power extracted from the smaller mass flow entering the turbine, must be greater than the power expended to inject water and carbon, mix and pressurize the reactants, recirculate light gases, and overcome shaft torque due to bearing friction, drag and the electric generator. Useful work from a turbine and generator assembly is typically 30% of the thermal energy added to the water for steam production. Makeup water equals the volume flow for disassociation to hydrogen and oxygen within the water heater and centrifuge, which is about 31.89 moles per second. About 51.6 kilojoules per mole of water heated to a temperature of 300° C. yields a steam flow of about 43.82 moles, or 0.79 liters per second, which produces about 678.5 kilowatts of useable work that is needed in the illustrated embodiment.

Steam for the turbine comes from the water heater and centrifuge. Water is heated by solar energy that heats the exterior surface of the water heater and centrifuge. Heat for the steam turbine is in addition to heat to disassociate water. The sum of the energy uses determines the size of the heliostat field. For the United States, a field size is estimated using solar irradiation at 33° N latitude, or less. Horizontal and NSEW vertical surfaces are used to derive the maximum available energy[xviii]. If a daytime average of about 66% of the available solar energy is reflected to the water heater and centrifuge, a minimum of 1.851 hectares of heliostat mirror surface is needed. The total heliostat surface area can be increased as needed. Electricity turns altitude and azimuth motors that aim the heliostats as the sun crosses the sky. If each heliostat uses about 60 watts of power to track the sun, the total array would consume about 185 kilowatts.

Ancillary power derived from the generator is assumed to consume 247 kilowatts, or 100% of all other work output excluding energy used to focus the heliostat array. Uses might include pumps that transfer water and fuel, pumps that lubricate bearings, and an electric motor that raises carbon from a holding pit to the inlet auger screw. A vacuum pump removes air from the carbon holding pit, which prevents air from entering the synthesizer. An airtight blanket might cover the carbon. Propane gas might fill voids in the carbon as air is removed. Air would likely be purged each time the carbon holding pit is filled. A volume of about 1,900 cubic meters of carbon supplies one solar-powered synthesizer for one year. A cubic bin, 12.4 meters or 41 feet per side, contains enough carbon for a full year of operation, so purging need not be a frequent occurrence. Gravity pulls fuel from the synthesizer catch basin to a settling reservoir where most entrained carbon is removed. A dredge recovers carbon that has settled in the reservoir. A vacuum pump maintains pressure below atmospheric pressure in the fuel catch basin of the synthesizer, which prevents fuel vapors from entering the atmosphere. Surveillance cameras and motion detectors might allow remote monitoring of the synthesizer operation.

Power is required for a chiller that cools a steam condenser at the turbine outlet. The illustrative embodiment reflects this approach. Alternatively, the design might also use the inflow of makeup water for water cracking as a cooling agent. The alternate design would include a vertical array of tubing that mists the inflow in a circular cascade surrounding the turbine outlet. While condensing steam at the turbine exhaust, misting also preheats the inflow before it enters the secondary reservoir from where it is pumped into the water heater and centrifuge. Water flow for the steam turbine is 1.4 times the flow needed for water cracking. Condenser work is typically included in the net efficiency of the vapor cycle. The vapor cycle efficiency will be optimized during reduction to commercial production.

If solar power is the only heat source, the synthesizers must be started daily. Startup rotation might be by an electric motor. Electricity for startup might come from a variety of sources including storage batteries and capacitors or the electrical grid. Since many synthesizers would start at the same time, batteries and capacitors might be economically favored as a clean, startup energy source over electricity from the grid.

Surplus electricity will be added to the electrical grid. The size of the heliostat array is optimized to the rate hydrogen permeates through the membranes that filter hydrogen. The membrane surface area is fixed, so during hours of greatest insolation, energy from the heliostats to disassociate water and produce hydrogen is greater than the maximum permeation. Excess hydrogen and freed oxygen catalytically recombine in the steam turbine and increase the rate of rotation. Generator load can be added without slowing the synthesizer below the design speed. Electrical output is controlled by varying current through the electromagnets of the generator or alternator. Varying the current varies the magnetic field, which varies the output current and the braking load. Power to move armature wires through a magnetic field is given by $P=(B^2L^2v^2)/R$, where $B=\mu_o i_o n$, and B is the magnetic field, L is the length of the armature wire normal to the rotation, v is the velocity the armature wire moves past the magnets, and R is the resistance of the armature wire. Power, P, is the rate of work moving the armature, and is the braking force of the generator. The permeability constant is $\mu_o$. Solenoid current is $i_o$ and n is the number of winding per unit length around the electromagnets. A tachometer measuring the synthesizer rotation regulates current to the electromagnets that regulate the magnetic flux of the generator.

The rotating assembly of the synthesizer must be balanced of avoid wobble. Automated, dynamic balancing will likely maintain balance. A circular array of moving weights and motors will likely attach to the lower plate of the synthesizer inlet. Electric motors drive weights along radially aligned, threaded rods. Accelerometers would control the operation and direction of the electric motors. Electricity will pass through slip rings and armatures. This design element is not drawn.

BRIEF DESCRIPTION OF THE DRAWINGS

FIG. 15 shows the negative bias electrode making contact with a long conducting bolt, and FIG. 16 shows the positive bias electrode making contact with a long conducting bolt.

FIG. 18 is an isometric, isolated view of the intermediate impeller strut.

FIG. 19 are isometric, isolated views of the main impeller strut.

FIG. 20 is an isometric view of the inner synthesizer wall.

FIG. 21 is an isolated isometric view of the multistage compressor outer wall.

FIG. 22 is an exploded isometric view of the fuel-float-valve assembly.

FIG. 25 is an exploded isometric view of a gate valve assembly that regulates the release of steam into the steam turbine. FIG. 25a is an enlarged view of the gear teeth at the base of the annular gate valve. FIG. 25b is an enlarged view of the gear teeth at the base of a plenum float assembly.

FIG. 26 is an isometric view from below the radial plane of the steam emitter ring.

DESCRIPTION OF THE ILLUSTRATED EMBODIMENT

Figure 1:
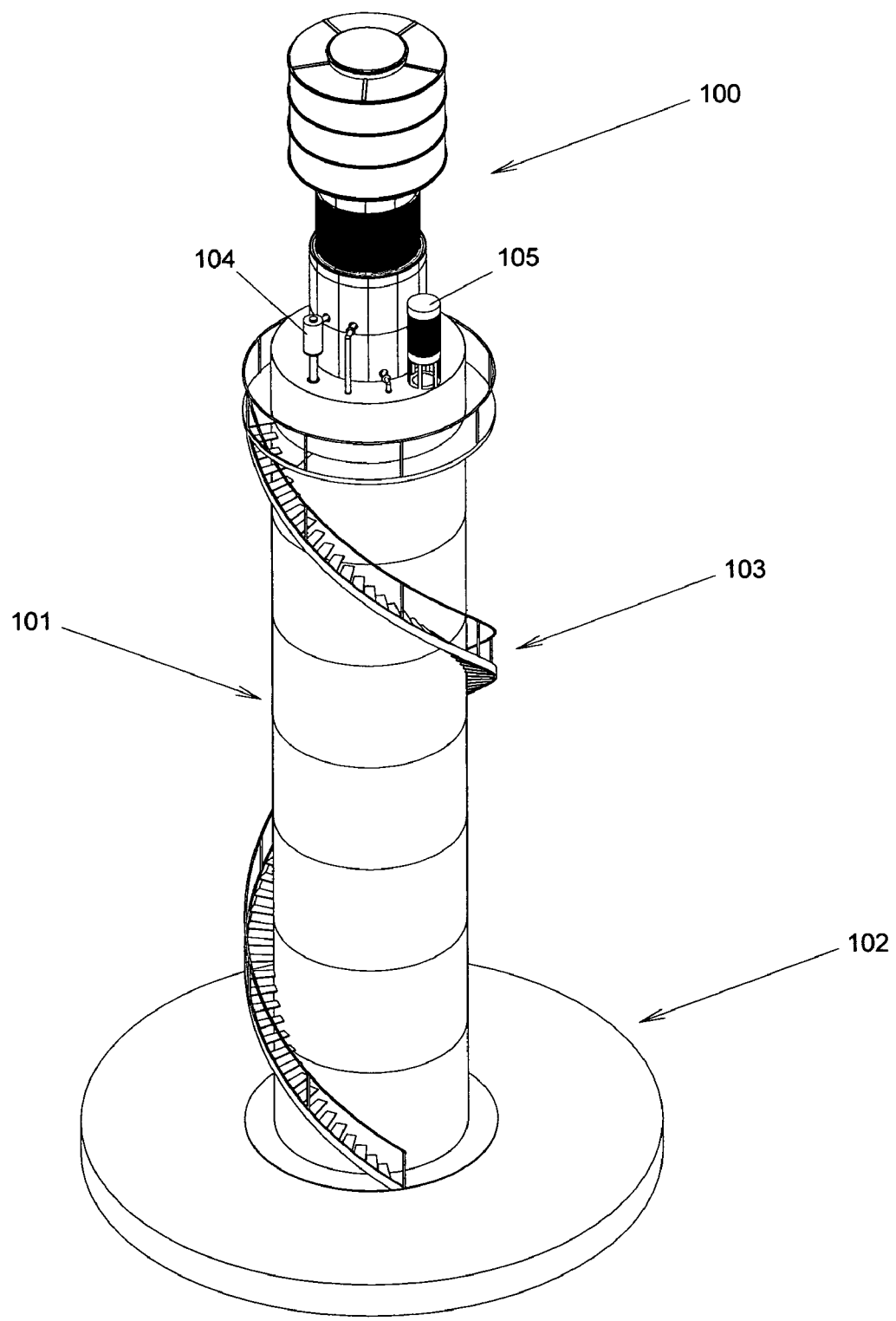
FIG. 1 is an isometric view of the illustrative embodiment of the solar-powered, liquid-hydrocarbon-fuel synthesizer atop a supporting tower. The tower is disposed at the center of a heliostat array that is not shown in the figure.

FIG. 1 is an idealized representation of the liquid-hydrocarbon-fuel synthesizer, 100, sitting atop a tower, 101. The tower height depends upon the production rate of the synthesizer. A smaller output will require a smaller heliostat array, and a shorter tower. FIG. 1 illustrates how a tower might look if built upon a foundation, 102, that doubles as a carbon holding pit. A transfer case, 104, changes the direction of carbon, lifted from the holding pit, from vertical to horizontal. Water might be stored in a tank disposed within the base of said tower. Pump, 105, condenses coolant that lowers the turbine outlet temperature and pressure. Maintenance access to said synthesizer is by stairs, 103. Said tower might include a retractable maintenance crane, not drawn, disposed near the top said tower. The crane lifts the rotating assembly for maintenance. Materials and supplies too heavy to transport by stair could be raised from ground level by such a crane. During operation of said liquid-hydrocarbon-fuel synthesizer, the crane would be retracted out of the site-line of the reflected solar energy. The figure is for illustration of the solar-powered application, and does not represent an engineered design of a synthesizer tower.

Figure 2:
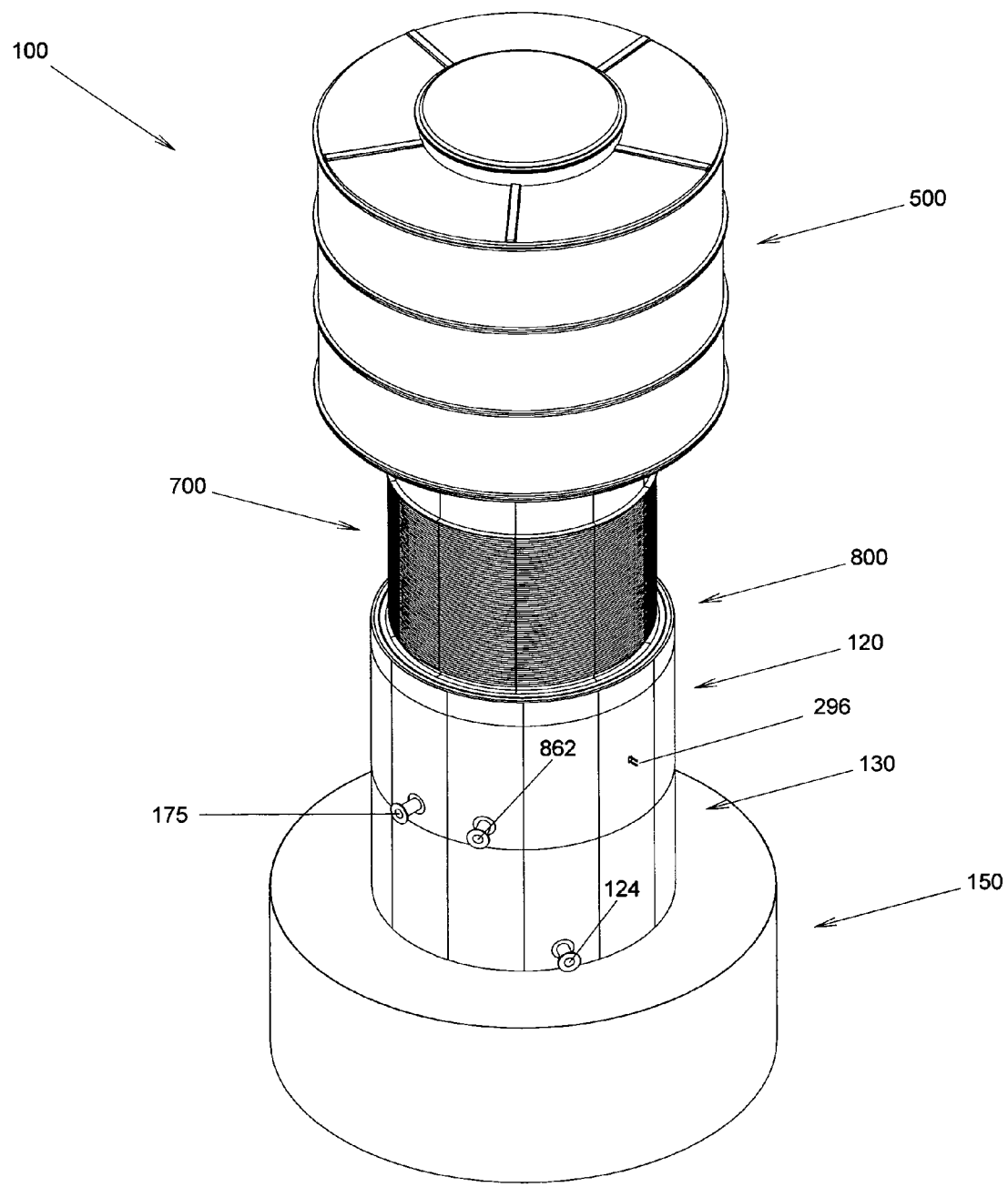
FIG. 2 is an isometric view of the principal, design elements of the exterior of the assembled solar-powered, liquid-hydrocarbon-fuel synthesizer.

FIG. 2 illustrates said solar-powered, liquid-hydrocarbon-fuel synthesizer, 100, which sits atop said tower illustrated in FIG. 1. FIG. 2 is shown at a larger scale than FIG. 1. Steam generator and water cracking assembly, 500, makes up much of the upper exterior of said solar-powered, liquid-hydrocarbon-fuel synthesizer. A portion of the hydrocarbon synthesizer, 700, is disposed below said steam generator and water cracking assembly. Below the synthesizer is the fuel separator assembly, 800. Said fuel separator assembly is disposed above the turbine outlet, 120. Said turbine outlet sits atop a generator room, 130. A secondary water storage tank, 150, is disposed at the base of the supporting structure of said solar-powered, liquid-hydrocarbon-fuel synthesizer. Carbon enters the synthesizer through carbon inlet pipe, 175. Water enters through make-up water inlet, 124. Liquid hydrocarbon fuel exits through fuel outlet, 862. Turbine outlet condenser coolant is recirculated through condenser fittings, 296.

Figure 3:
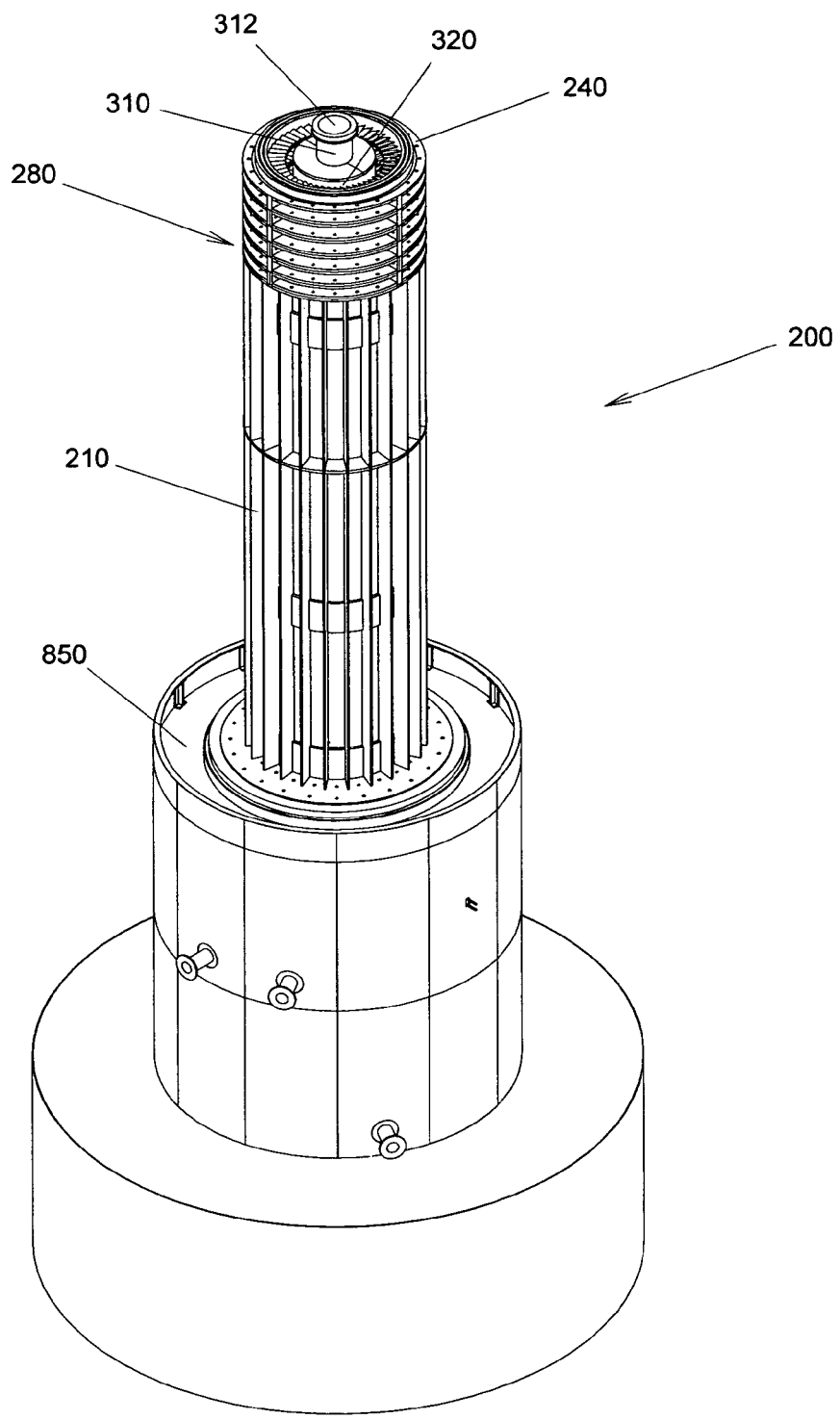
FIG. 3 is an isometric view of the stationary elements of the assembled solar-powered, liquid-hydrocarbon-fuel synthesizer.
Figure 4:
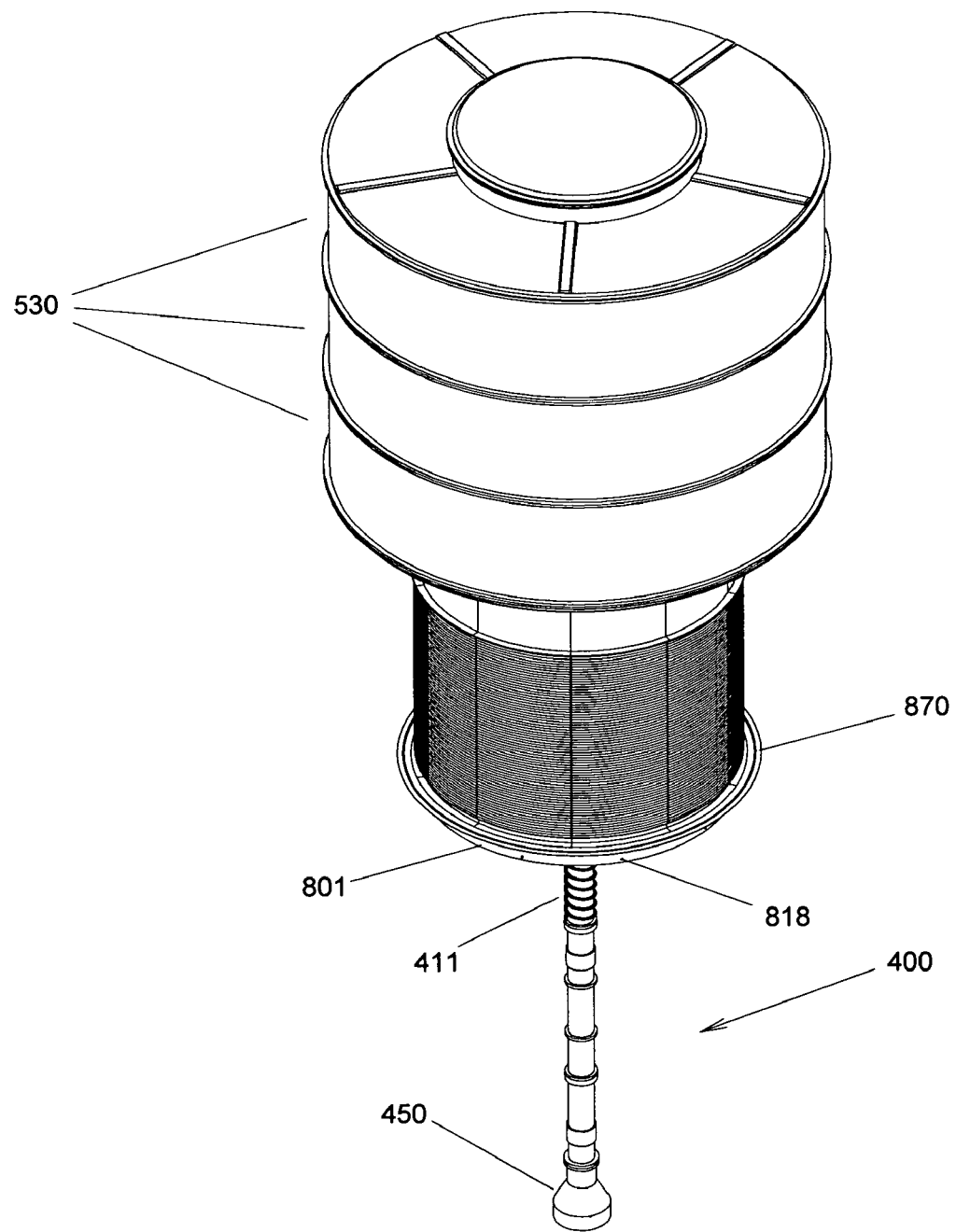
FIG. 4 is an isometric view of the rotating assembly of the assembled solar-powered, liquid-hydrocarbon-fuel synthesizer.

FIG. 3 and FIG. 4 isolate the stationary parts of the solar-powered, liquid-hydrocarbon-fuel synthesizer, illustrated in FIG. 3, from the rotating assembly, illustrated in FIG. 4. Steam turbine housing, FIG. 3, 200, is comprised of turbine-housing base, 210, stator ring sections through stage 6, 280, and stage 1 stator ring, 240. Integrated inlet, FIG. 4, 400, rotates in inlet passage, FIG. 3, 312, of stationary feed pipe, 310. Said stationary feed pipe is disposed in the hollow center of rotor pedestal, 320. Collection basin, 850, of said fuel separator, FIG. 2, 800, surrounds the base of said steam turbine housing. A sliding rotary seal, FIG. 4, 870, spans from said collection basin to the upper surface of liquid-gas-separator tub, FIG. 4, 801. Liquid hydrocarbon fuel exits said liquid-gas-separator tub through an array of fuel drain holes, 818. A carbon-auger blade, 411, is affixed to the upper section of said integrated inlet, which extends below said liquid-gas-separator tub. An impeller screw, 450, attaches to the lower end of said integrated inlet. The water heater and centrifuge, 530, is illustrated as an assembly of three identical sections.

Figure 5:
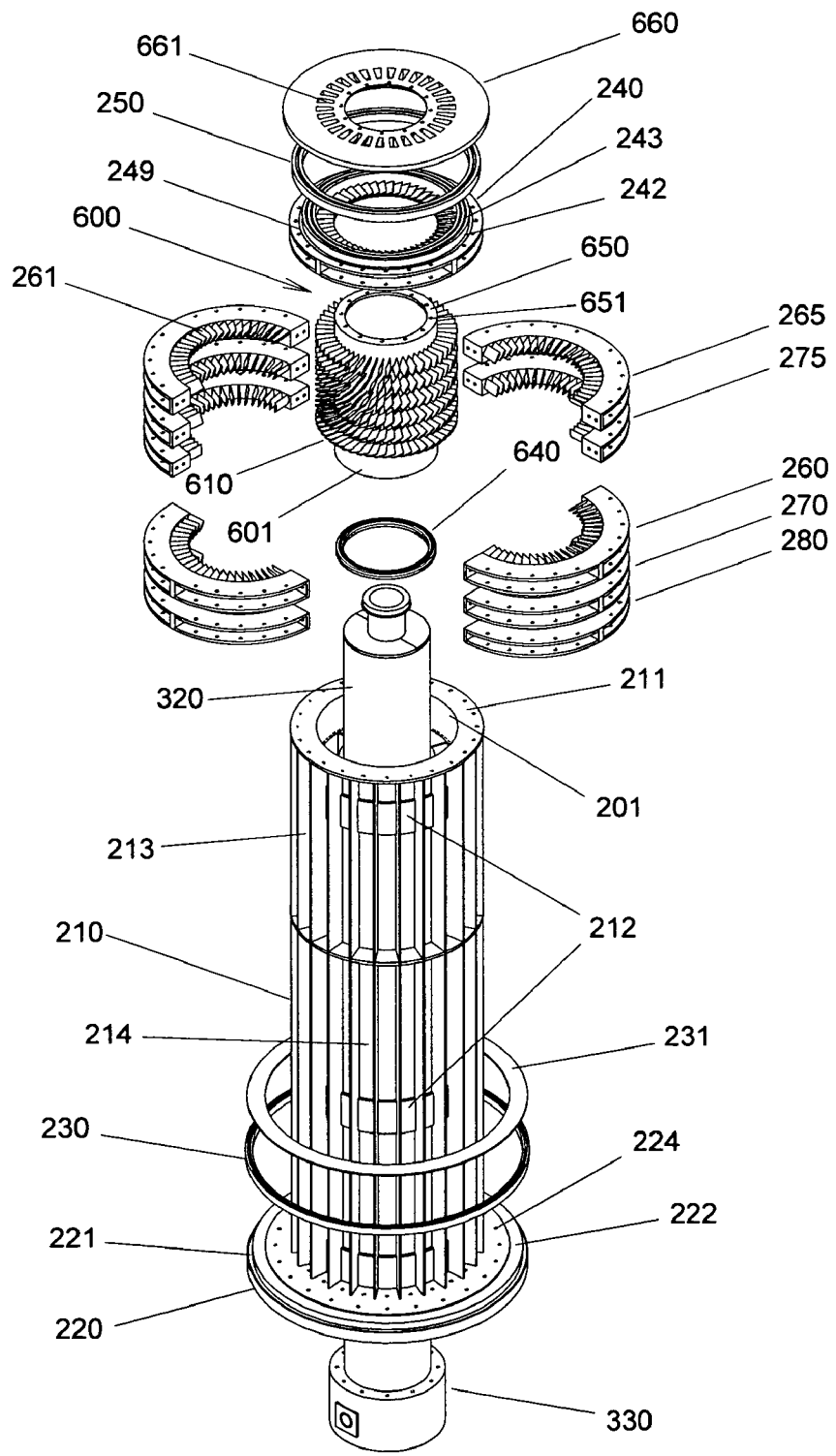
FIG. 5 is an isometric view of the component parts of the steam turbine. The turbine pedestal is disposed in the axial center of the turbine-housing base.

FIG. 5 illustrates the components of the axial-flow steam turbine. Turbine rotor, 600, is comprised of rotor tube, 601, and rotor vanes, 610. Said rotor tube fits onto rotor pedestal, 320. Steam emitter ring, 660, attaches to rotor flange, 650, of said turbine rotor. Bearings facilitate rotation of said turbine rotor. An upper main bearing, 250, turns in place between said stage 1 stator ring, 240, and said steam emitter ring. The inner cage of said upper main bearing presses onto upper main bearing seat, 249, and the outer-radius surface of pressure rings, 242. Said steam emitter ring presses onto the outer bearing cage. Downward emanating pressure rings, FIG. 26, 662, on said steam emitter ring engage and rotate in pressure-ring channel, FIG. 5, 243, of said stage 1 stator ring. Two pressure rings and one channel are illustrated, but multiple pressure rings and channels might be used. A pressure-sealing bearing might seat within one or more of said pressure-ring channels. Rotor bearing, 640, inserts into said rotor tube at the base thereof, and presses onto the exterior cylindrical surface of said rotor pedestal. Said upper main bearing and rotor bearing fix the alignment of said turbine rotor.

Said steam turbine housing includes a series of stator stages. Stator stages 2 through 6 are split halves. This permits the housing to be assembled around said rotor vanes disposed between the stator stages. Stator stages 2 through 6, 260, 265, 270, 275 and 280, respectively, are assembled around said turbine rotor after said rotor bearing and turbine rotor are installed on said rotor pedestal. Threaded fasteners, not drawn, join said stator ring halves to form complete turbine stages, and the adjoined sections of each stage are vertically secured to adjacent stages by threaded fasteners, not drawn. The lowest stator stage attaches to the stator ring flange, 211, disposed at the top of said turbine-housing base, 210. Stage-one stator ring attaches to the uppermost of the assembled stages. The steam turbine has an axial flow. Steam enters through steam inlets, 661, in a generally downward direction parallel to the vertical axis of said rotor tube. Vane orientation of said turbine rotor and stator stages changes with elevation. As drawn, the first stage stator has vanes having a more horizontal orientation while said turbine rotor has vanes with a more-vertical orientation. Steam exiting the first stage of said steam turbine is swept between stage 2, stator vanes, 261, which have a greater angle with the horizontal compared to the first stage. Second stage, rotor vanes have a smaller angle with the horizontal. The change in vane angles continues through the successive stages of said steam turbine. A reverse order of rotor and stator vanes might be used. Vane orientation might affect the operation of said steam turbine. As drawn, the orientation might produce greater lift and less turning torque, while a reversed order might produce greater torque and less lift. High temperature in said water heater and centrifuge requires a strong, pressure-containing vessel, and the resulting assembly is likely to be heavy. The stage order is drawn with a vane orientation intended to produce greater lift in the first stage, thereby reducing the weight supported by the bearings. The angular speed of said steam turbine is low, but the moment of inertia for the rotating mass is high, which might favor the opposite stage order. The optimal vane orientation for the actual rotating mass will be determined during reduction to commercial production. The vane surfaces of the first stator stages might have a catalyzing material to react and recombine any hydrogen and oxygen present, and to convert hydrogen peroxide formations to oxygen and steam.

Lower main bearing, 230, fits onto lower main bearing seat, 221, on base flange, 220. Lower-main-bearing, upper retainer, 231, secures the inner cage of said bearing to said turbine-housing base. Said lower-main-bearing retainer fits on bearing retainer seat, 222, disposed on said base flange. Fasteners, not drawn, secure the upper retainer to said base flange. Said upper retainer prevents said lower main bearing from lifting off said lower main bearing seat. The outer cage of said lower, main bearing is secured to the lower-main-bearing seat, FIG. 12, 802, of said liquid-gas-separator tub. Rotor pedestal, FIG. 5, 320, is disposed in the axial center of said steam turbine housing. Together, said rotor pedestal and said steam turbine housing form steam exhaust channel, 201, that extends through said turbine-housing base. Said rotor pedestal extends below said base flange of said turbine-housing base, and terminates in rotor pedestal base, 330. Structural ribs, 213, strengthen the tubular wall, 214, of said turbine-housing base. Rotor-pedestal-spacer support bands, 212, align with turbine-housing spacer, FIG. 6, 340. Threaded fasteners, not drawn, pass through fastener passages FIG. 5, 224, in said base flange of said turbine-housing base, and anchor and align said turbine housing pedestal, FIG. 27, 290.

Figure 6:
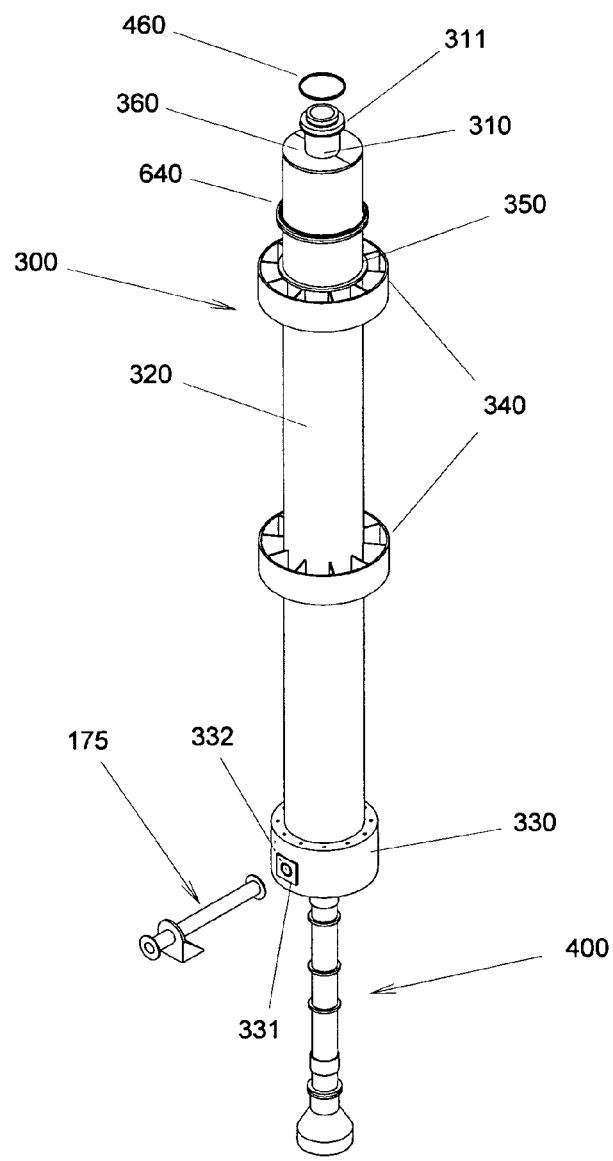
FIG. 6 is an isometric view of the rotor pedestal and stationary pipe.

FIG. 6 discloses the elements of the rotor pedestal assembly, 300. Rotor bearing, 640, presses onto rotor bearing seat, 350, disposed at the top of upper turbine-housing spacer, 340. Said turbine-housing spacers locate said rotor pedestal in turbine-housing base, FIG. 5, 210. Rotor-pedestal-spacer support bands, FIG. 5, 212, strengthen said turbine-housing base in the regions where said turbine-housing spacer abuts the inner wall of said turbine-housing base. Alignment screws, not drawn, might pass through said rotor-pedestal-spacer support bands, to precisely align said rotor pedestal inside said turbine-housing base. This permits said rotor pedestal and turbine-housing base to be installed as pieces if proven beneficial. Rotor-pedestal top plate, 360, seats in the top circular opening of said rotor pedestal and secures stationary feed pipe, FIG. 6a, 310, to rotor pedestal, FIG. 6, 320. Pipe bearing support, FIG. 6a, 370, inserts into rotor pedestal base, FIG. 6, 330, and secures and aligns said stationary feed pipe at the base. Said pipe bearing support is affixed to the turbine outlet, floor plate, FIG. 27,121. Carbon bearing seal, FIG. 6, 460, press-fits onto carbon bearing-seal seat, 311, and snuggly inserts into carbon bearing-seal seat, FIG. 13, 714, disposed at the base of carbon-injection impeller wheel, 710. Carbon inlet pipe, FIG. 6, 175, is joined to carbon inlet pipe attachment plate, 331. Said carbon inlet pipe aligns with the horizontal carbon inlet pipe, FIG. 6a, 315 of said stationary feed pipe when said horizontal carbon inlet pipe is inserted into carbon inlet passage, FIG. 6, 332, through said rotor pedestal base. Said rotor pedestal is a hollow cylindrical shell. The lower portion of said integrated inlet, 400, extends from said rotor pedestal base, and the top of said integrated inlet extends above the top of said stationary feed pipe.

Figure 6A:
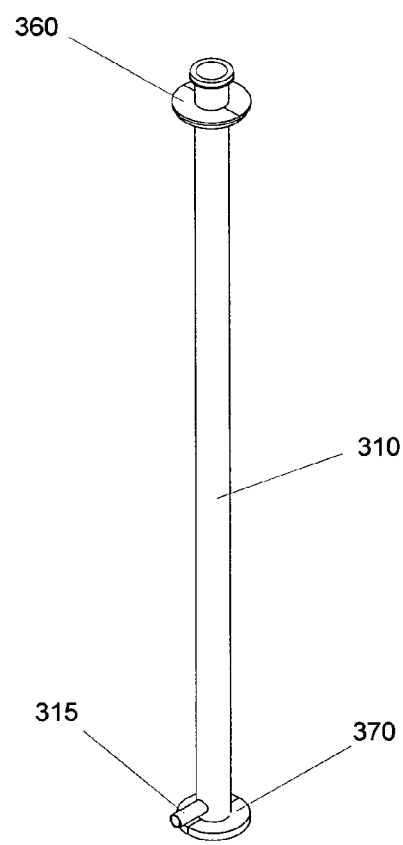
FIG. 6a is an isometric view of the stationary pipe.
Figures 7, 7A:
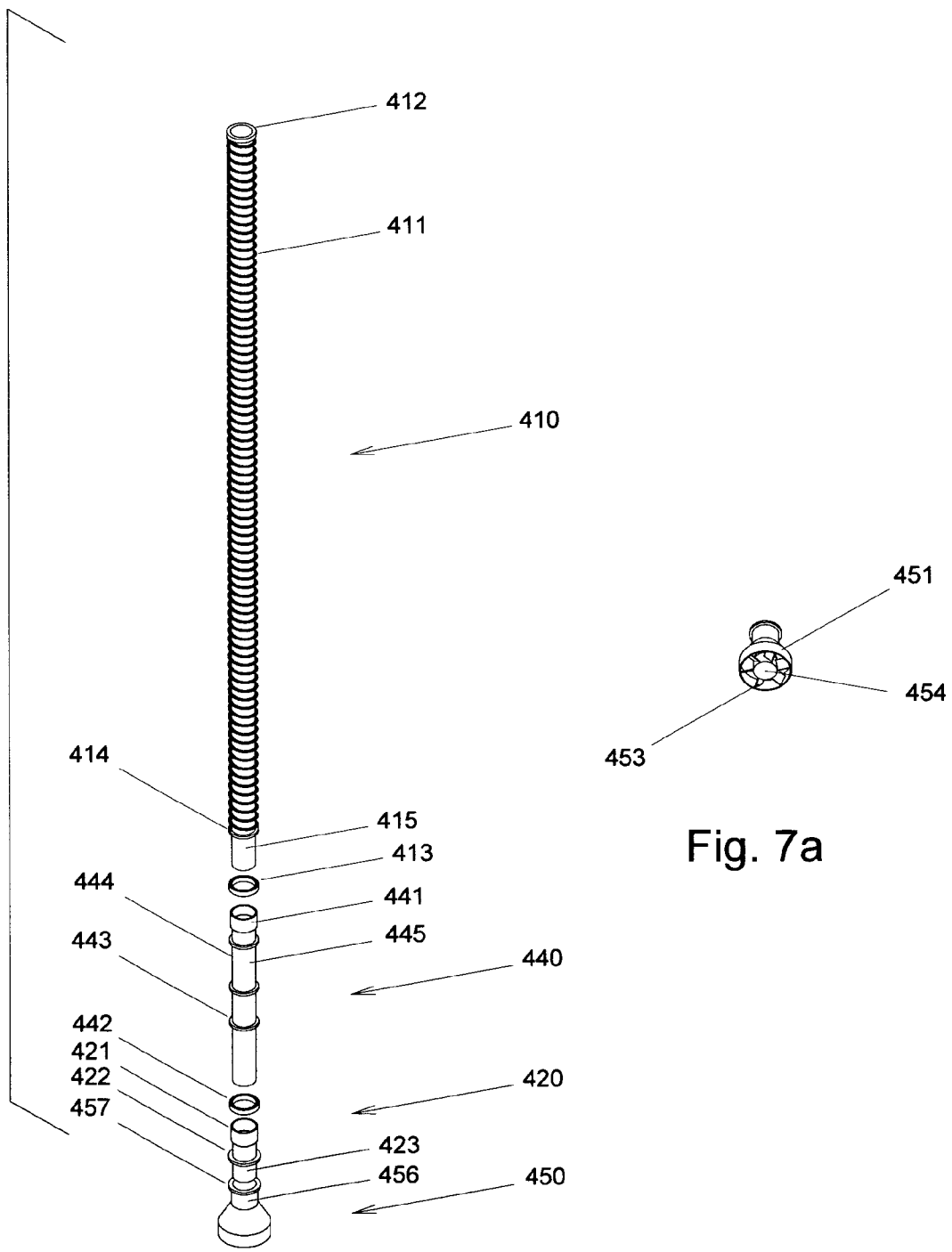
FIG. 7 is an isometric view of the carbon auger and water inlet pipe and attached impeller screw.
FIG. 7a is an isometric view from below the horizontal plane of the impeller screw.

FIG. 7 illustrates the sections of said integrated inlet. Said integrated inlet is divided into four principle sections. The upper section of said integrated inlet is auger pipe extension, 410. Carbon auger blade, 411, spirals around auger pipe, 415, the lower end of which inserts into coupling, 441, disposed at the top of the generator pipe extension, 440. Auger pipe bearing, 413, slides onto said auger pipe and abuts bearing seat, 414. The outer cage of said auger pipe bearing inserts into the base of stationary feed pipe, FIG. 6a, 310, and the lower, outer-radius cage abuts pipe bearing support, 370. Said auger pipe extension terminates at the top as a flange, FIG. 7, 412, which affixes to a torque plate, FIG. 8, 520. A high torque force is transmitted through said torque plate, flange, and auger pipe extension, which are fabricated of high-strength materials. Said generator pipe extension couples to said auger pipe extension at the base thereof after said auger pipe bearing is seated in said pipe bearing support. Torque is transmitted through said coupling. Splines, not drawn, on the mating sections will likely be used to align the pipe sections and transmit torque through the joint. A generator armature, not drawn, is disposed in the armature region, FIG. 7, 444, of generator pipe, 445. Generator pipe bearing, 442, slides onto said generator pipe and abuts bearing seat, 443. The outer cage of said generator pipe bearing inserts into the inset of lower pipe bearing support, FIG. 27, 380. Said lower pipe bearing support locates the lower end of, and vertically supports said generator pipe extension. Said generator pipe bearing is likely of the tapered-roller type, anti-friction bearing that is designed to support high thrust and lateral loads.

Water pipe extension, FIG. 7, 420, connects to said generator pipe extension at the base thereof after said generator pipe bearing is seated in said lower pipe bearing support. Said generator pipe inserts into coupling, 421, disposed at the top of said water pipe extension. Torque is transmitted through the connection. Splines on mating surfaces and setscrews might transmit torque through the connection. Threads turned opposite the direction of rotation, thusly tightening under load, are another means of making the connection. Lastly, a submersible bearing might be used at the base of screw hub, FIG. 7a, 454, of the impeller screw, FIG. 7, 450. In that embodiment, splined mating sections alone might be used to transmit torque through the connection. The weight of said water pipe extension and attached impeller screw would be supported by the submersible hub-screw bearing as opposed through the generator pipe to water pipe connection. The base of water pipe, 423, of said water pipe extension inserts into impeller screw pipe, 456, of said impeller screw. The sections are affixed by fasteners, not drawn, joining flange, 457, of said impeller screw to flange, 422, of said water pipe extension.

FIG. 7a is an isometric view from below the horizontal plane of said impeller screw. Impeller screw blades, 453, span between screw hub, 454, and impeller-screw housing, 451. Above the blades of said impeller screw, said impeller-screw housing and screw hub narrow. Said impeller-screw housing narrows to the radius of said impeller screw pipe, and said screw hub narrows to a pointed tip, above which said screw hub does not continue.

Figure 8:
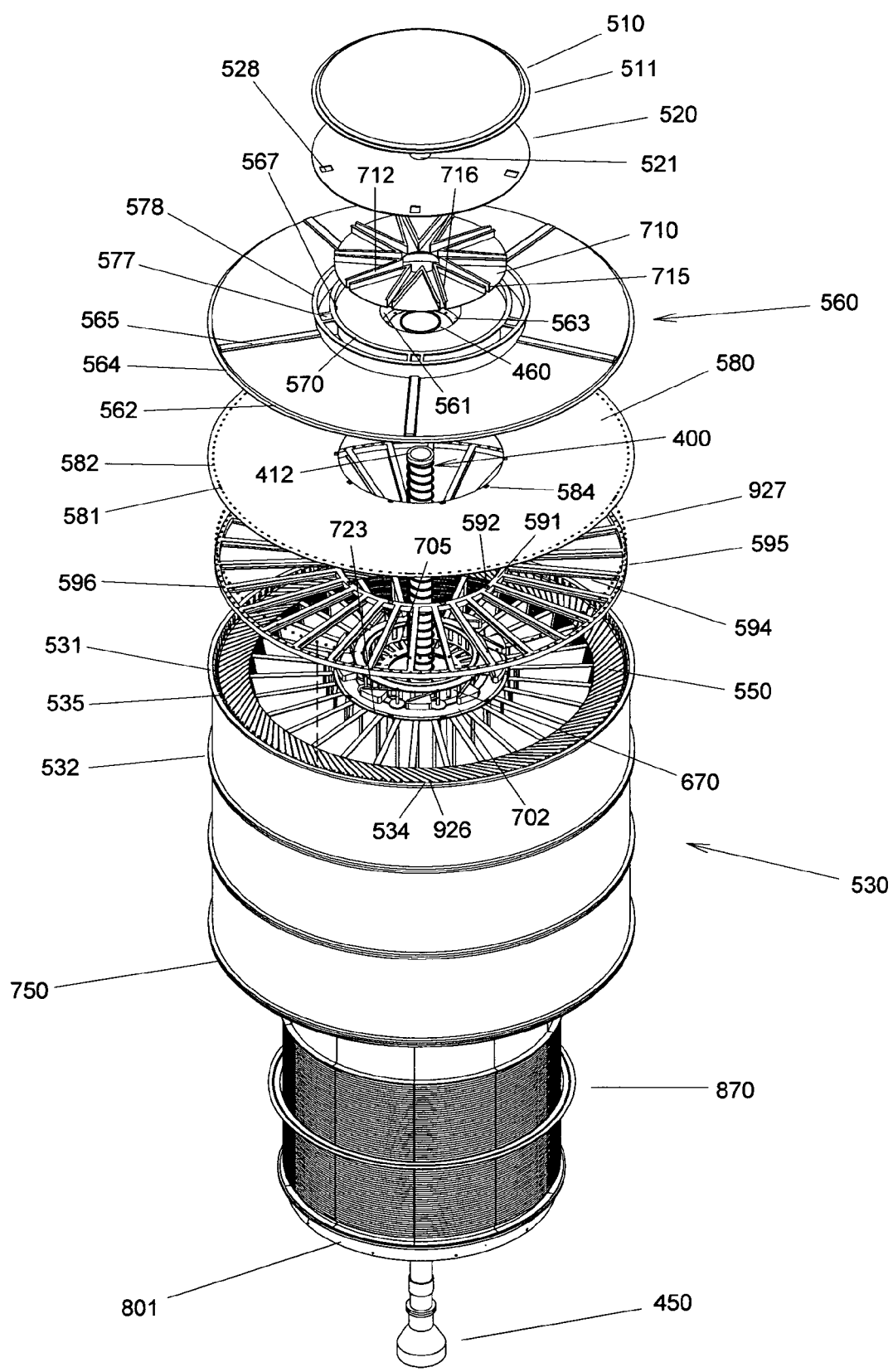
FIG. 8 is an isometric view of a partially separated embodiment of the rotating assembly. The water cap, torque plate, carbon impeller wheel, carbon bearing-seal, turbine-inlet upper and lower plates, and support frame are separated from the remainder of the rotating assembly.
Figure 9:
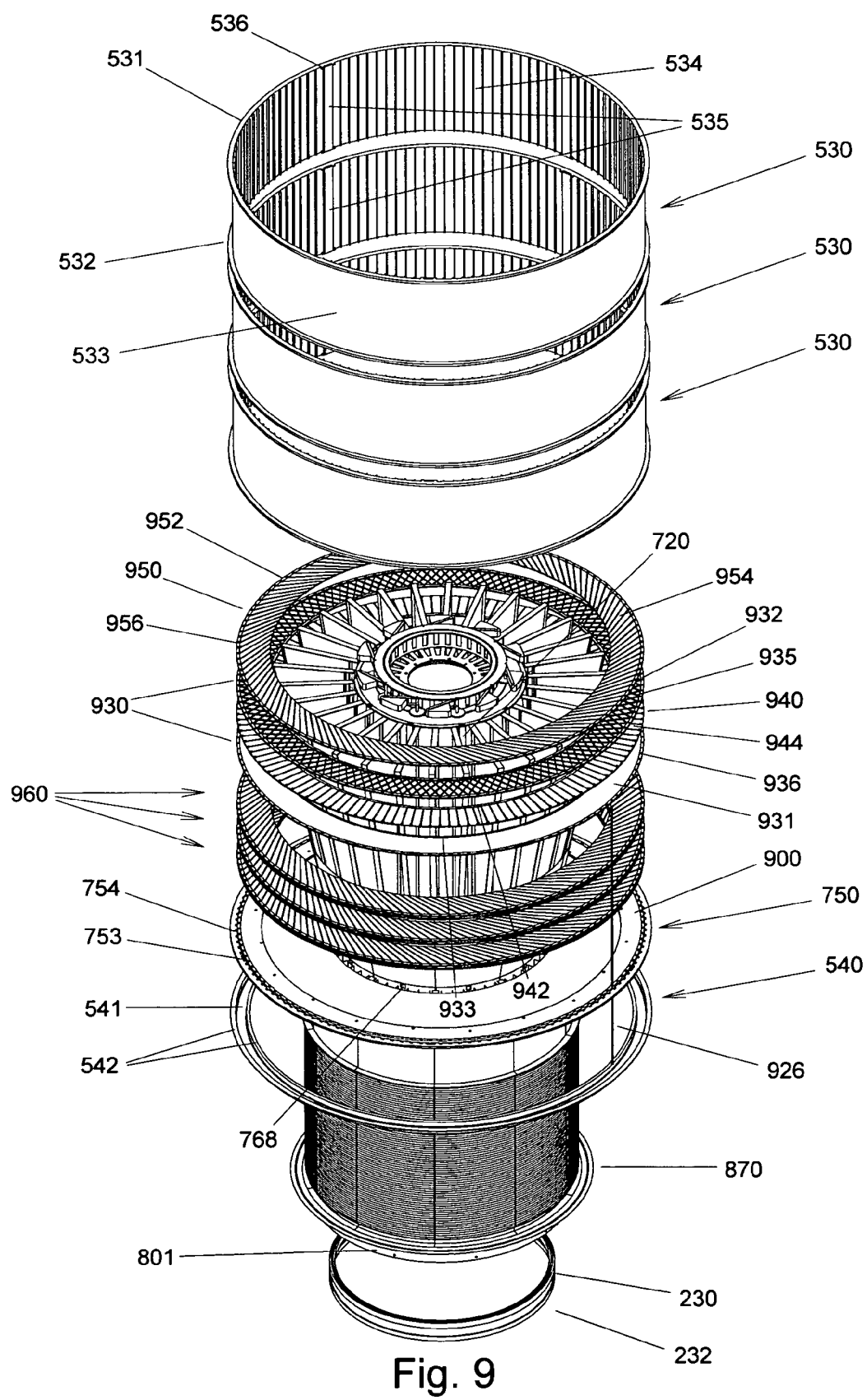
FIG. 9 is an isometric view of a partially separated embodiment of a portion of the rotating assembly. The water heater and centrifuge sections, membrane assemblies, and lower water distribution ring are separated.

FIG. 8 and FIG. 9 are exploded isometric views of components of the rotating assembly. Water exiting the top of integrated inlet, 400, flows through a chamber formed by water cap, 510, and torque plate, 520. Said water cap is affixed through water cap flange, 511, to upper plate, 560. Threaded fasteners, not drawn, pass through said water cap flange and torque plate and seat in fastener seats, not drawn, in distribution ring outer flange, 578. Said torque plate is also affixed to carbon-inlet-cavity flange, 570, disposed on said upper plate. Said torque plate also secures to flange, 412, of said integrated inlet. Said water cap and torque plate form a watertight inlet chamber. Water flows through water outlet passages, 528, of said torque plate into inlets, 577, into water-injection channels, 565. Water flows radially outward through said water-injection channels that are affixed to the top surface of said upper plate. Said water-injection channels turn downward near the outer radius of said upper plate.

Water inflow is channeled downward through water-injection passages, 581, equally spaced near the perimeter of the circular, lower plate, 580. The inflow enters closed water-injection downdraft channels, FIG. 9, 535, arrayed around the interior of the water heater and centrifuge, 530. Water exits said water-injection downdraft channels, downward through water-injection passages, 753, through synthesizer-inlet lower plate, 750, and enters lower water-distribution ring, 540. Water circulates around the annular channel, 541, of said lower water-distribution ring, before moving upward through water inlet passages, 754, disposed in said synthesizer-inlet lower plate. Water is heated and centrifuged in the void formed between said water heater and centrifuge and a joined, stack of membrane wall assemblies, 960, that forms the inner-radius wall. Impeller blades, 534, centrifuge and heat water in said void.

Said upper plate and said lower plate, form the circular, inlet plenum of said steam turbine. Inner annular wall, FIG. 8, 561, and outer annular wall, 562, form an upward emanating recess in said upper plate. Said upper plate is joined through flange, 563, at the inner radius thereof to said turbine rotor. Heated water enters the turbine-inlet plenum through water inlet passages, 582, circularly arrayed near the outer perimeter of said lower plate. Heated water exits said turbine-inlet plenum as steam flowing through turbine inlet passages, 705, through inner-perimeter wall, top plate, 702. Turbine inlet governor, 670, regulates the flow of steam into said steam turbine. Fasteners, not drawn, join said upper plate, said inner-perimeter-wall top plate, and steam emitter ring, FIG. 5, 660, to rotor flange, FIG. 5, 650, when seated in threaded fastener seats, FIG. 5, 651. Threaded fasteners, not drawn, pass through said lower plate, inner structural ring FIG. 8, 591, and seat in ribband, 723, that is affixed to said inner-perimeter wall at the top thereof. Threaded fasteners, not drawn, join said upper plate and lower plate to upper flange, 531, of said water heater and centrifuge. Said lower plate is secured to radial I-beams, 594 that span between said inner structural ring and the outer support ring, 595.

Said lower water-distribution ring affixes to said synthesizer-inlet lower plate. Threaded fasteners, not drawn, pass upward through outer-radius flange, FIG. 9, 542, of said lower water-distribution ring and through said synthesizer-inlet lower plate, before securing in threaded seats, not drawn, in lower flange, 532, of the lowest section of said water heater and centrifuge.

Membrane wall assemblies, 960, are disposed at the inner radius of said water heater and centrifuge. Said membrane wall assemblies abut stubby centrifuge impeller blades, 534, at the inner radius of said centrifuge impeller blades. Said membrane wall assemblies are annular assemblies comprised of four main parts, including two membrane disc assemblies, 930, one negative bias disc, 950, and one positive bias disc, 940. Said negative and positive bias discs, electrically bias the surfaces of the membranes by creating electric fields that cross membrane discs, 931. Said negative bias disc insulation is formed with upward and downward emanating, low profile, angled vanes, 954. Said positive bias disc insulation is formed with upward and downward emanating, low profile vanes, 944. Said low profile angled vanes of said negative bias disc exhaust hydrogen radially inward from said membrane wall assemblies. Said low profile vanes of said positive bias disc, accelerate fluids that enter gas-trapping membrane pockets disposed between said positive bias disc insulation, FIG. 15, 941, and the adjacent membrane surfaces. The outward angle of the vanes of said positive bias disc could be fixed at different angles to adjust the pressure inside said gas-trapping membrane pockets. Said membrane discs span between inner-radius and outer-radius annular frames, FIG. 9, 933 and 932, respectively, that are rigidly joined by inter-frame webbing, 935. Two membrane disc assemblies, surround, and abut said positive bias disc. Threaded fasteners, not drawn, secure said membrane disc assemblies to inner annular wall, 942, of said positive bias disc. The joined assembly closes said membrane pocket in the radially inward direction. One membrane disc assembly is inverted relative to the other so that both membrane discs abut said low profile vanes of said positive bias disc. Said positive bias disc and two membrane disc assemblies, together form a gas-trapping, membrane pocket assembly. Said negative bias discs are disposed between membrane disc assemblies of adjacent gas-trapping, membrane pocket assemblies. Said membrane wall assemblies are stacked one atop another to form a watertight wall. The illustrative embodiment presented herein has a stack of 58 membrane wall assemblies.

Figure 17:
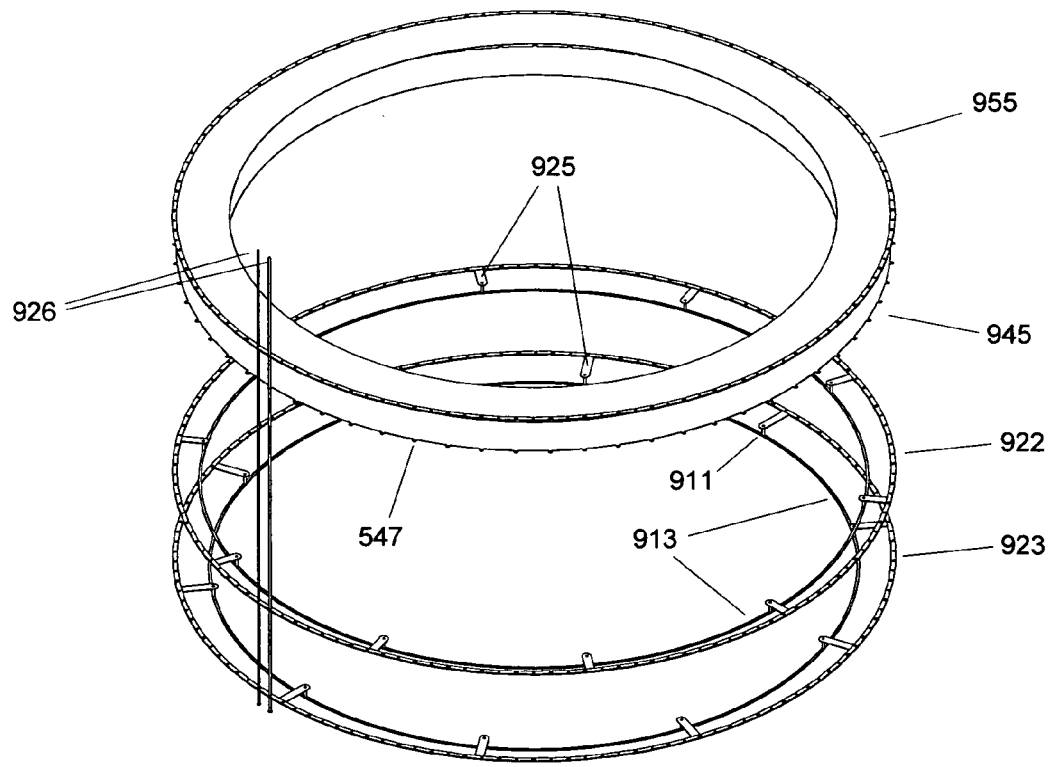
FIG. 17 is an isometric view of the charge distributor rings of the charge distributor plate assembly and the positive and negative bias electrodes of the positive and negative bias discs. Each slip ring is shown adjacent to the charge distributor ring to which it connects.

Each membrane wall assembly is threaded onto a circular array of long bolts, FIG. 8, 926, and FIG. 9, 926. Said long bolts are also conductors that charge positive and negative bias electrode plates encapsulated within the insulation of said positive and negative bias discs, respectively. Said long bolts are electrically insulated at the bolt head and adjacent unthreaded shank where said bolt head abuts, and the shank passes through synthesizer-inlet lower plate, 750. Insulation can be an insulating coating of said bolt or an insulating seat and bolt passage. Said long bolt is exposed to water circulating in said lower water-distribution ring, so an insulating coating might be favored. The upper, threaded end of said long bolt seats in a recessed passage, 596, in said outer support ring. Threaded nuts, FIG. 8, 927, secure said long bolts. Said threaded nuts and the upper, threaded ends of said long bolts also must be insulated. An insulating seat is favored at this end of the bolts. Said long bolts pass through charge distributor assembly, FIG. 9, 900, that sits atop said synthesizer-inlet lower plate. Two charge distributor plates, FIG. 17, 922 and 923, are embedded in an insulating material. Said long bolts pass through said distributor plates. Half of said long bolts make electrical contact with one distributor plate, and the other half of said long bolts make electrical contact with the other distributor plate. The long bolts that make electrical contact with one distributor plate also make electrical contact with said negative bias electrodes of all membrane wall assemblies. Those bolts pass through insulation that surrounds and electrically isolates the bolt passages through the positive bias electrodes of all membrane wall assemblies. Alternatively, long bolts that contact the other distributor plate also make contact with said positive electrode plates of all gas-trapping, membrane pocket assemblies while being electrically isolated from said negative bias electrode plates. Opposing charges are applied to said distribution plates by a slip ring assembly disposed at the underside of said synthesizer-inlet lower plate. One of two slip rings, FIG. 12, 913, passes through said synthesizer-inlet lower plate and makes electrical contact with one distributor plate. The second slip ring makes contact with the second distributor plate. Insulator ring, FIG. 12, 912, electrically isolates said slip rings from said synthesizer-inlet lower plate. Only one long bolt is shown in FIG. 9. FIG. 17 further illustrates the means by which said long bolts transfer electrical charge to said negative-bias and positive-bias electrode plates.

Carbon exiting near the top of said integrated inlet, FIG. 8, 400, spills outward from said auger blade, FIG. 7, 411. Carbon is swept outward by carbon-injection impeller wheel, FIG. 8, 710. Carbon bearing-seal, 460, seats against the base of said carbon-injection impeller wheel and said carbon bearing-seal seat, FIG. 6, 311. Said carbon bearing-seal prevents carbon from falling into the interior region of said rotor tube, FIG. 5, 601. Said torque plate abuts said carbon-injection impeller wheel. Threaded fasteners, not drawn, secure said torque plate to flanges, FIG. 8, 716, disposed at the top of impeller channels, 712. The connection strengthens said torque plate. Carbon exits said carbon-injection impeller wheel through impeller wheel outlets, 715. Carbon travels downward through carbon-injection channels, FIG. 8 and FIG. 13, 567, through upper plate, FIG. 8, 560. Carbon passes through carbon-injection passages, 584, through said lower plate, 580, and carbon-injection channels, 592, of inner structural ring, 591. Carbon then enters downdraft channels, FIG. 9, 720, arrayed around said ribband affixed to said inner-perimeter wall, top plate. Carbon enters the hydrocarbon synthesizer through carbon-injection channels, 768.

Figure 10:
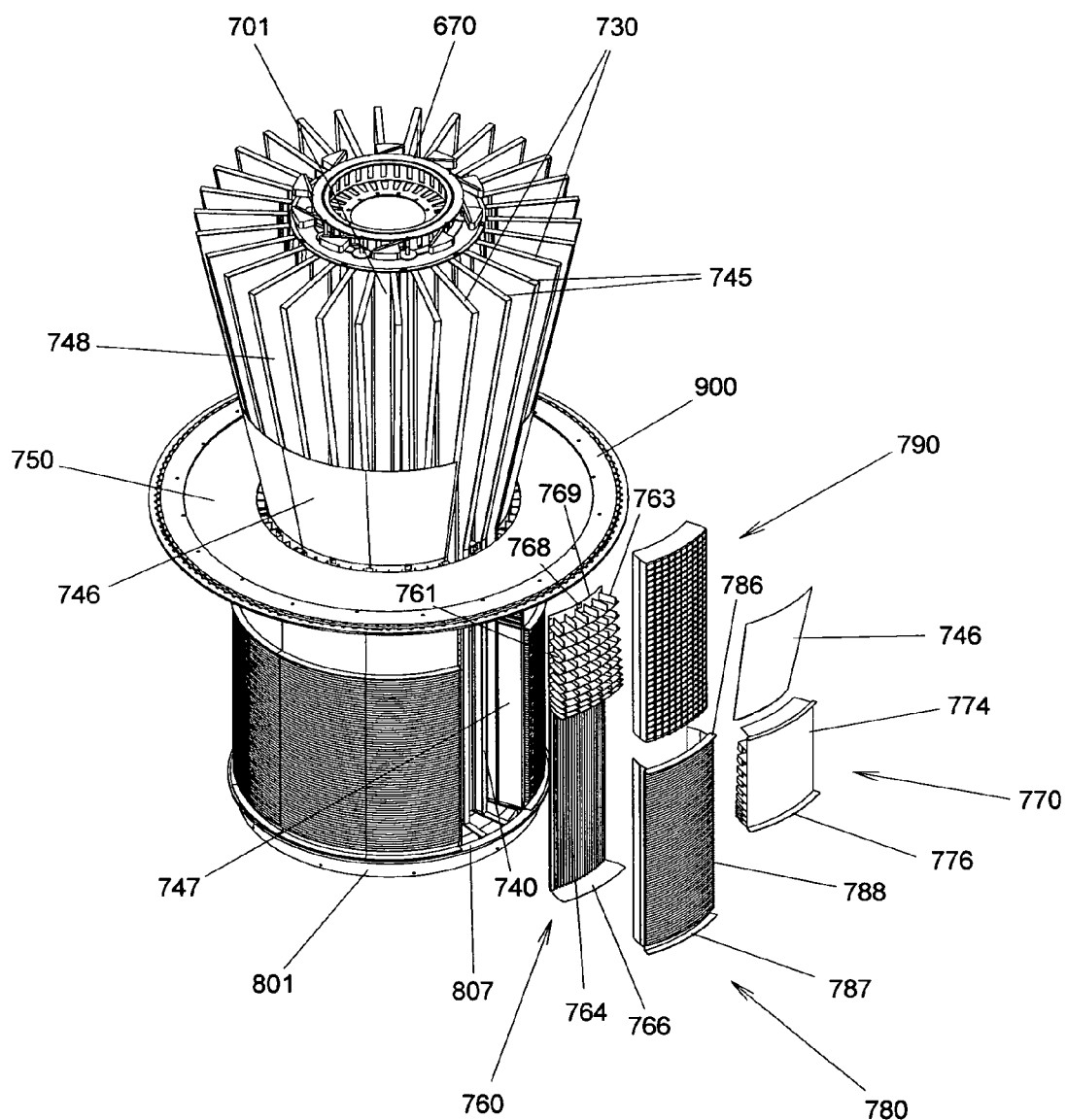
FIG. 10 is an isometric view of the hydrocarbon synthesizer. One synthesizer inner wall, condenser bed, condenser bed housing, multistage compressor outer wall, and blower cladding section are separated from the hydrocarbon synthesizer assembly.

FIG. 10 is an isometric view of the hydrocarbon synthesizer. A circular array of main impeller columns, 730, isolated in FIG. 19, surround said inner-perimeter wall, 701, which is detailed in FIG. 11. Intermediate impeller columns, 745, isolated in FIG. 18, are circularly arrayed between said main impeller columns. Blower cladding, 746, affixes to all said impeller columns. Gases accelerated by said impeller columns, exhaust through blower exhaust, 748, between the uppermost edges of said blower cladding and the uppermost surface of said impeller columns. The region from the tops of said impeller columns to said synthesizer-inlet lower plate, 750, forms the gas inlet of said hydrocarbon synthesizer. When this region is enclosed by said membrane wall assemblies, FIG. 9, 960, the gas inlet is largely open and smooth, and little surface induced acceleration occurs in the interior thereof. Said impeller columns and said low profile angled vanes of said negative bias discs, mix gases in the gas inlet. Gas exhausted from the blower are propelled outward toward said membrane wall assemblies. Said membrane wall assemblies vent hydrogen gas emerging at the membrane surfaces, inward into said gas inlet.

Synthesizer inner-wall assemblies, 760, isolated in FIG. 20, seat against flanges, 740, detailed in FIGS. 18 and 19, of said impeller columns. Webbing, 747, detailed in FIG. 19, between the flanges of the radially extended regions of said main impeller columns isolates said synthesizer inner-wall assemblies from each other. Integral, multistage compressor, 761, is disposed in the upper portion of said synthesizer inner-wall assemblies. Conforming compressor stage elements are disposed on compressor outer-wall assembly, 770, detailed in FIG. 21. Said compressor outer-wall assembly engages the multistage compressor portion of said synthesizer inner-wall assembly, and is secured to outer-radius flange, FIG. 19, 741, of said main impeller columns. When installed, impeller blades, FIG. 21, 773, of said compressor outer-wall assembly are disposed between impeller blades, FIG. 20, 763, of said synthesizer inner-wall assembly. Compressor stage, upper plate, FIG. 21, 772, and base plate, FIG. 20, 762, bound each said compressor stage. The arc ends of said compressor stage upper and base plates abut the lower and upper horizontal surfaces of interstage channel flanges, FIG. 19, 738. Interstage channel vanes, FIG. 19, 737, in said main impeller columns accelerate product radially inward toward the inlet of the next, lower compressor stage. Said base plates and attached impellers of said synthesizer inner wall do not extend the full distance to the outer wall, FIG. 10, 774, of said compressor outer wall assembly. Product exits each compressor stage downward through spaces between said base plates and said outer wall. The space between said base plates and said outer wall are smaller for each successive, lower compressor stage; i.e., each successive base plate extends radially outward a greater distance than the base plate disposed immediately above. Similarly, said upper plate and affixed impeller blades do not extend the full distance to inner wall, 769, of said synthesizer inner-wall assembly. Product enters the next compressor stage downward through openings created by the separation of said upper plates and said inner wall. The vertical dimensions of said affixed impeller blades decreases with each successive compressor stage. Similarly, the vertical dimensions of said interstage vanes decreases with each successive interstage channel. Said impeller blades that are affixed to said upper and lower plates of said multistage compressor, create a radial flow toward said outer wall that turns downward into largely-open interstage channels. Progressive narrowing compresses product flowing through said multistage compressor. An alternate embodiment might have multistage compressor sections that plug-in as a complete assembly and with different vane angles.

Figure 23A:
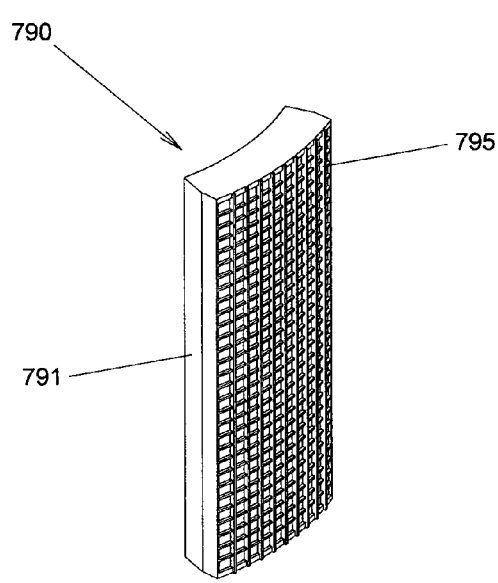
FIG. 23a and FIG. 23b are isometric views from opposite sides of the condenser bed.
Figure 23B:
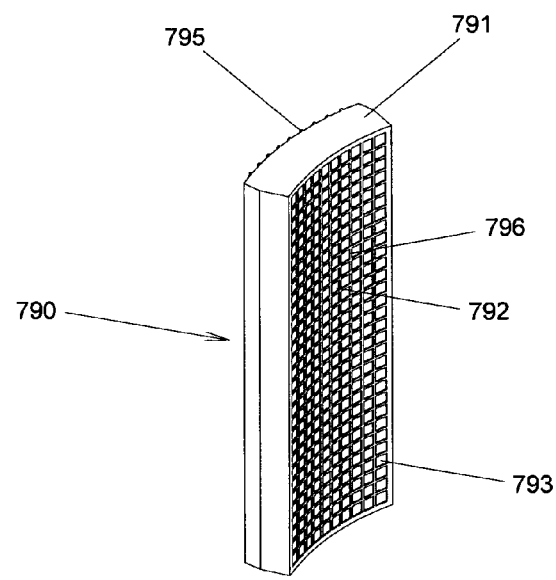
Figure 24A:
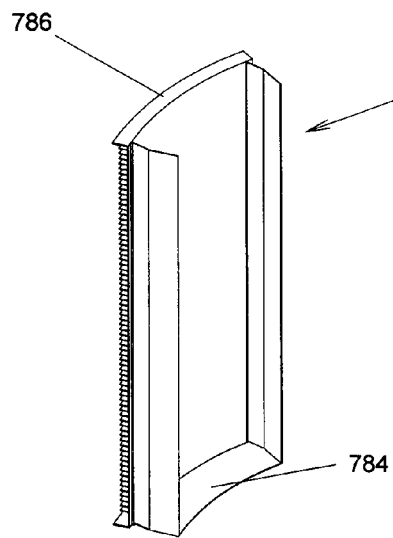
FIG. 24a and FIG. 24b are isometric views from opposite sides of the condenser bed housing.
Figure 24B:
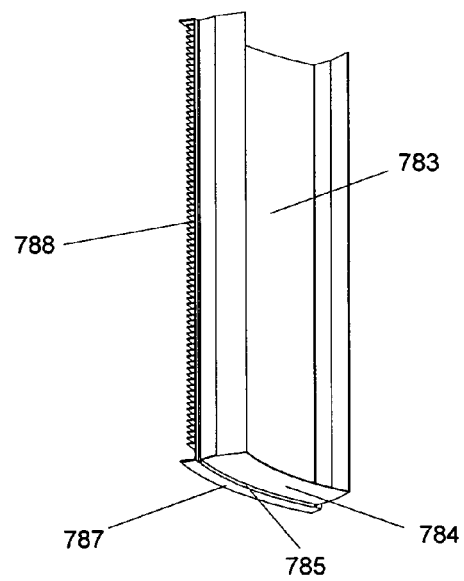

Condenser bed housing, 780, detailed in FIG. 24a and 24b, is disposed below the lowest compressor stage. Upper flange, 786, is joined to lower flange, 776, of said compressor outer-wall assembly. Lower flange, 787, is joined to the inner flange surface, 807, of said liquid-gas-separator tub, 801, shown separated in FIGS. 11 and 12. Threaded fasteners, not drawn, secure the adjoining flanged surfaces. Condenser-cavity base plate, FIGS. 24a and 24b, 784, rests on floor plate, FIG. 10, 766, of said synthesizer inner-wall assembly. Condenser beds, 790, detailed in FIGS. 23a and 23b, insert downward into said condenser bed housings and rests on said condenser-cavity base plate. Long, vertical condenser bed impellers, FIG. 10, 764, emanating radially outward from the lower region of said synthesizer inner-wall assembly, radially accelerate the product mix exiting the lowest compressor stage into said condenser bed. Said condenser-cavity base plate does not extend to condenser-cavity outer wall, FIG. 24b, 783. The small separation between said condenser-cavity base plate and said condenser-cavity outer wall forms drain passage, FIG. 24b, 785. The outer-radius, curved edge of said synthesizer-inner-wall base plate aligns at the outer radius of said condenser-cavity base plate. Vertical frame members, FIG. 23b, 796, of said condenser bed have outer-radius frame extensions, FIG. 23b, 795, that extend radially outward beyond the body of the frame, FIG. 23b, 791. Said outer-radius frame extensions span said drain passage of said condenser bed housing. Liquid and gaseous hydrocarbons and hydrogen pass through said condenser beds and exit said condenser beds at the outer radius thereof. After exiting, they flow downward between said outer-radius extensions of said condenser beds, through said drain passage of said condenser bed housing, and into said liquid-gas-separator tub. Horizontal cooling fins, FIG. 10, 788, are affixed to the outer-radius surface of said condenser-cavity outer wall. Said cooling fins remove excess thermal energy from the exiting product, while strengthening said curved condenser-cavity outer wall, against which said condenser bed, outer-radius extensions bear. Threaded fasteners secure said condenser-cavity outer wall to said outer-radius flanges of said main impeller columns. Multi-planar, side walls of said condenser bed housing and said condenser beds conform to the arc segment formed by said webbing of said main impeller columns, while permitting full insertion between said outer-radius flanges. An alternate embodiment might have condenser beds and condenser bed housing shaped as sections of a conic shell rather than cylindrical shells. Said floor plate, FIG. 10, 766, of said synthesizer inner-wall assembly is secured to base flanges, FIGS. 18 and 19, 735, of said main impeller columns and intermediate impeller columns.

Carbon enters said hydrocarbon synthesizer at the entrance of the first stage of said multistage compressor. Carbon is ejected from short, radial channel extensions, FIG. 11, 722. Said radial channel extensions extend from carbon inlet downdraft channels, 720. Carbon passes through carbon-injection passage, FIG. 10, 768, through said synthesizer inner-wall assembly. Threaded fasteners, not drawn, secure said synthesizer inner-wall assembly to flange, FIG. 11, 721, disposed at the outer-radius of said radial channel extension. It may prove necessary to add a small hooded extension surrounding said carbon-injection passage of said synthesizer inner-wall assembly in order to prevent gases at the first-stage inlet of said compressor from entering the carbon inlet channel.

Figure 11:
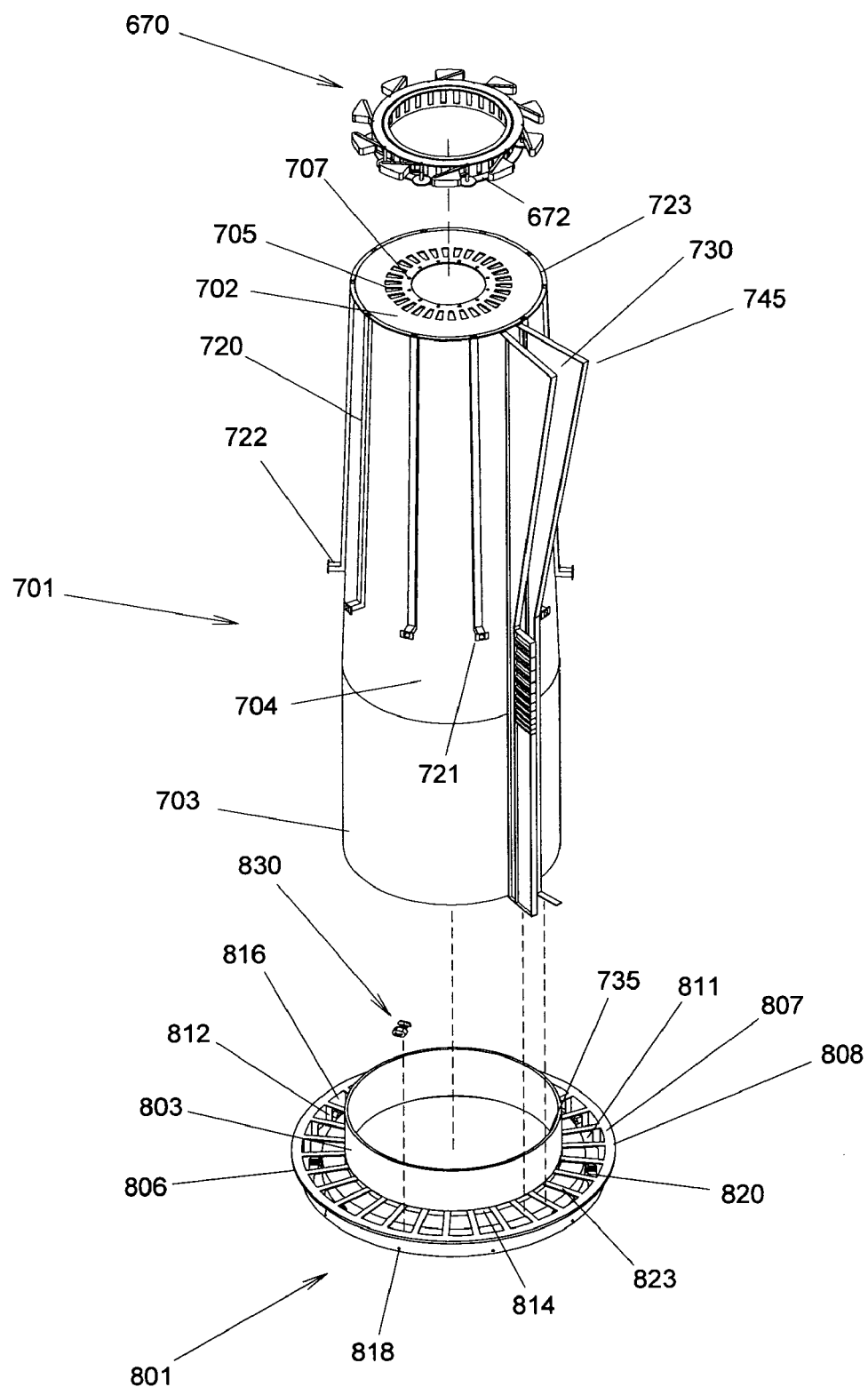
FIG. 11 is an isometric view of the inner-perimeter wall and the turbine-inlet, float-valve mechanism, main and intermediate impeller struts, liquid-gas-separating centrifuge tub, and fuel float valves.

FIG. 11 is an isometric view illustrating the coupling of said inner-perimeter wall, 701, to liquid-gas-separator tub, 801, and turbine inlet governor, 670. Said inner-perimeter wall is divided into three principle regions: said inner-perimeter wall, top plate, 702, inner-perimeter wall, conical section, 704, and inner-perimeter wall, cylindrical joint, 703. Steam enters the turbine through turbine inlet passages, 705, arrayed around said inner-perimeter wall, top plate. Threaded fasteners, not drawn, secure governor-housing flange, 672, to said inner-perimeter wall, top plate. Fasteners, not drawn, pass through fastener holes, 707, and join said upper plate, said inner-perimeter wall, and said steam emitter to said turbine rotor. Carbon inlet downdraft channels, 720, are affixed to said inner-perimeter wall, conical section. Said carbon inlet downdraft channels are joined at the upper terminus thereof by ribband, 723. Said ribband is affixed to said inner-perimeter wall. Inner annular wall, 803, of said liquid-gas-separator tub inserts into said inner-perimeter wall, cylindrical joint. Said inner-perimeter wall abuts inner-perimeter wall support lip, 814. Said inner-perimeter wall will likely be welded to said liquid-gas-separator tub.

Main impeller column, 730, and intermediate impeller column, 745, connect to said liquid-gas-separator tub. Both impeller columns rest on radial flanges, 823, which span between said inner annular wall and annular flange, 806. Fasteners, not drawn, pass through base flanges, 735, of both impeller columns and secure to threaded seats, not drawn, in said radial flanges. Float valve assemblies, 830, detailed in FIG. 22, are installed in said liquid-gas-separator tub. The outer-radius ends of float rods, FIG. 22, 840, plug into matching cylindrical recesses, not visible, emanating outward from the inner-radius surface of centrifuge basin, outer annular wall, FIG. 11, 816. The inner-radius ends of said float rods rests in semicircular seats disposed in float rod pedestals, 820. Threaded fasteners, not drawn, pass through fastener passages, FIG. 22, 845, and secure float rod cap, FIG. 22, 843, to said float rod pedestal. A valve plug, FIG. 22, 831, seats against the inner radius of fuel drain hole, FIG. 11, 818. Centrifuge impellers, 812, radially accelerate liquids and gases entering said centrifuge basin. Small openings, not visible, at the outer-radius, lower corners of said centrifuge impellers, balances liquid accumulating in said centrifuge basin by allowing the fluid level to equalize between said centrifuge impellers. Said centrifuge impellers extend radially inward, the radial depth of denser heptane and octane liquid radial-accumulations needed to lift said fuel float valves off said drain holes. The limited, radially inward dimension of said centrifuge impellers avoids radial acceleration of less dense hexane and pentane, which might accumulate at the inner-radius surface of the liquids. The absence of radial, acceleration at the inner-radius surface of the rotating liquid volume allows vapor pressure and low pressure produced at the inlet of the blower to convert liquid hexane and pentane to a recirculated gas. Condenser bed housing, detailed in FIGS. 24a and 24b, and sliding rotary seal, FIG. 8, 870, fasten to the inner flange surface, FIG. 11, 807, and outer flange surface, 808, of annular flange, 806. Threaded fasteners, not drawn, secure the joints.

Figure 12:
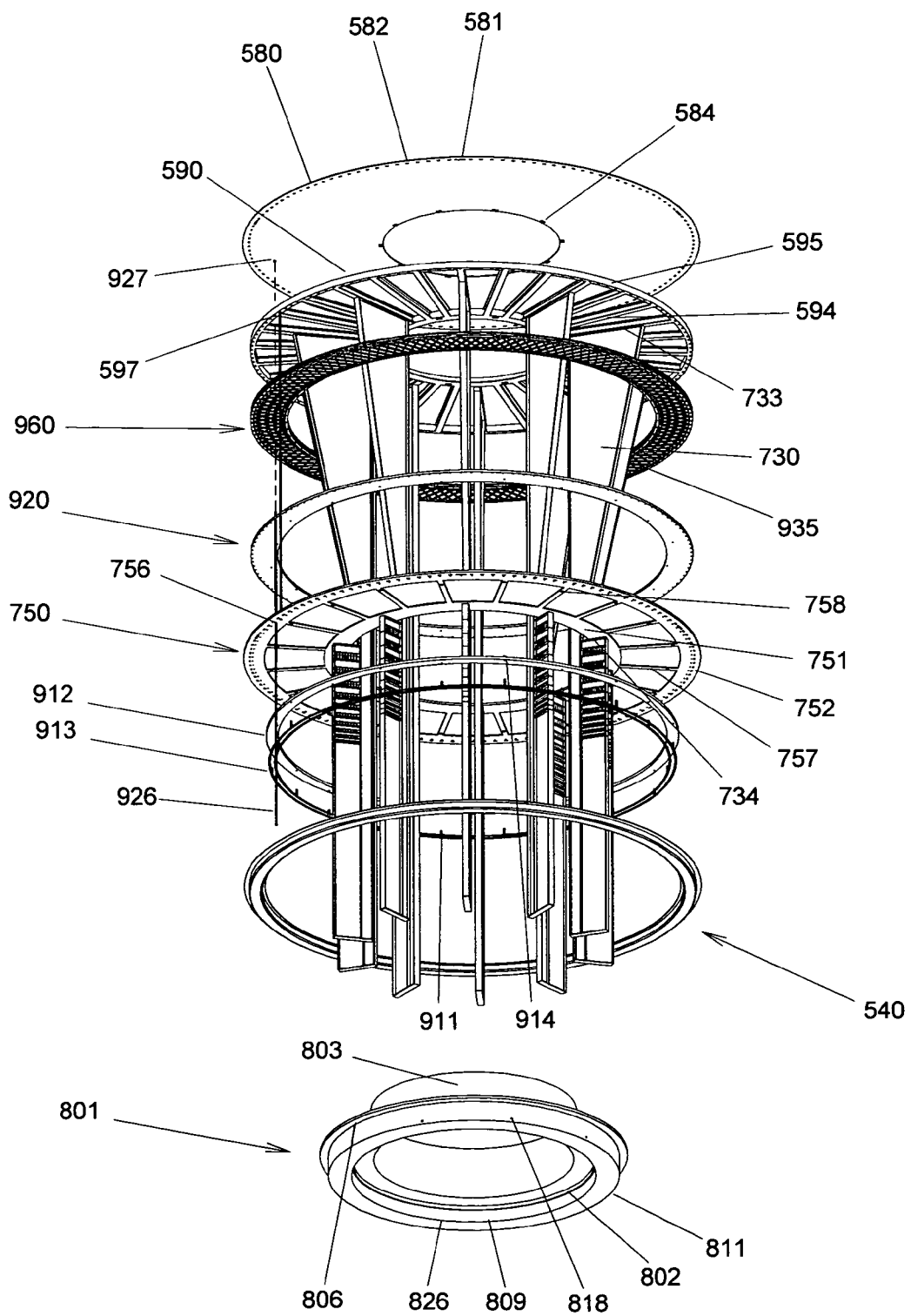
FIG. 12 is an isometric view from below the horizontal plane of the joining of the main impeller struts to the synthesizer-inlet lower plate and supporting frame. The turbine inlet lower plate, membrane assembly, charge distributor, slip rings and insulator ring, lower water distribution ring, and liquid-gas-separating centrifuge tub are shown in this figure.

FIG. 12 is an isometric view from below the horizontal plane. FIG. 12 illustrates the manner said main impeller columns join to support frame, 590. Threaded fasteners, not drawn, secure the top flange, FIG. 19, 733, of said main impeller column to the lower flange of radial I-beams, FIG. 12, 594. Intermediate impeller columns, detailed in FIG. 18, attach to the lower flange of said radial I-beams disposed between said I-beams that are connected to said main impeller columns. FIG. 12 discloses the underside of said synthesizer-inlet lower plate, 750. Structural ribs, 757, span between the inner flange, 751, and outer flange, 752, of said synthesizer-inlet lower plate. Fasteners, not drawn, secure lower plate flange, FIG. 19, 734, to said inner flange of said synthesizer-inlet lower plate. Lower water-distribution ring, FIG. 12, 540, attaches to said outer flange of said synthesizer-inlet lower plate. Slip ring lugs, 911, and insulator ring inserts, 914, plug into insulator passages, 758, disposed near the outer-radius ends of said structural ribs. Lug nuts, not drawn, secure slip rings, 913, and insulator ring, 912, to the base of said synthesizer-inlet lower plate. A circular array of long bolts, 926, pass through membrane wall assembly, 960, before passing through long bolt passages, 597, and being secured in place by threaded nuts, 927. Inter-frame webbing, 935, of the lower, said membrane disc assembly of said membrane wall assembly is seen from below the horizontal plane.

FIG. 12 discloses the underside of lower plate, 580. Water flows downward through water-injection passages, 581, and upward through water inlet passages, 582, that lead into the inlet plenum. Carbon flows downward through carbon-injection passages, 584.

The stationary, turbine-housing base, FIG. 5, 210, is disposed within the center of said liquid-gas-separator tub. The outer cage of said lower main bearing, FIG. 9, 230, presses onto lower-main-bearing seat, FIG. 12, 802. Said lower-main-bearing, lower retainer, FIG. 9, 232, inserts into bearing recess, FIG. 12, 809. Fasteners, not drawn, thread through the centrifuge basin inner annular wall, 826, and secure said lower-main-bearing, lower retainer in place.

Figures 13, 13A:
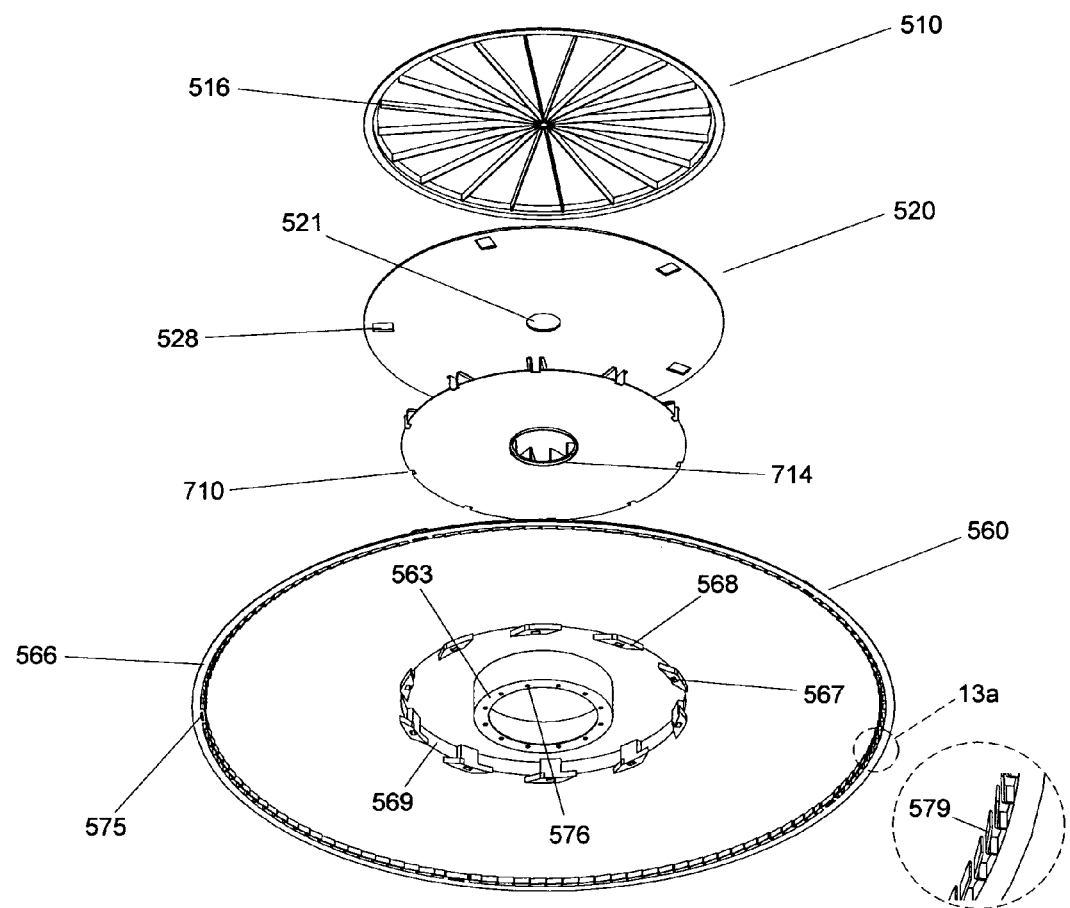
FIG. 13 is an isometric view from below the horizontal plane of the water cap, torque plate, carbon impeller wheel, carbon bearing-seal, and turbine-inlet upper plate.
FIG. 13a is an enlargement of the radial vanes of the turbine-inlet upper plate.

FIG. 13 is an isometric view from below the horizontal plane. FIG. 13 discloses the undersides of said water cap, 510, said torque plate, 520, said carbon-injection impeller wheel, 710, and said upper plate, 560, all shown previously in FIG. 8. The upward emanating recess is visible from the underside of said water cap. Water enters the cavity formed between said water cap and said torque plate through the water inlet, 521, and is accelerated by radial vanes, 516. The vanes might be curved in alternate embodiments. Threaded fasteners, not drawn, pass through said torque plate and seat in flange FIG. 7, 412, of said integrated inlet. The joint keeps water from said carbon-injection impeller wheel. Carbon bearing-seal, FIG. 6, 460, abuts carbon bearing-seal seat, FIG. 13, 714. Carbon-injection channels, 567, of said upper plate also function as plenum impellers, 568. The leading edges in the direction of rotation accelerate heated water toward the axis-of-rotation. The lower surface of inner flange, 563, rest on the inner-perimeter wall, top plate, FIG. 11, 702. Threaded fasteners, not drawn, pass through fastener holes, FIG. 13, 576, and secure said inner flange to said turbine rotor, FIG. 5, 600. Water-injection channel outlets, 575, of said upper plate, are arrayed near the outer perimeter. Said water-injection channel outlets align with said water-injection passages, FIG. 12, 581, arrayed near the perimeter of lower plate, FIG. 12, 580, and between water inlet passages, FIG. 12, 582. Water flows upward through said water inlet passages into the upward emanating recess of said upper plate that is said turbine-inlet plenum that is disposed between said upper and lower plates. Said turbine-inlet governor is disposed in the upward extending recess surrounding inner flange, FIG. 13, 563.

High temperature water enters said turbine-inlet plenum between plenum inlet vanes, enlarged in FIG. 13a, 579. The vane blades are radial where they surround water inlet passages, FIG. 12, 582. At a smaller radius from the axis-of-rotation, each plenum inlet vane turns from the radial direction to a direction approaching anti-parallel to the rotation. Here, the vane blade forms an acute angle with a circle having a radius extending from the axis-of-rotation to the point where the vane blade turned. The trailing edge of the vane blade is at a smaller radius from the axis-of-rotation than where the vane turned. Water entering the turbine-inlet plenum, first fills the voids between said plenum inlet vanes. Flow into the turbine-inlet plenum is from the outer radius, inward toward the turbine inlet. Said plenum inlet vanes radially accelerate water in the same manner as centrifuge impeller blades, FIG. 9, 534, inside said water heater and centrifuge, FIG. 9, 530. In the radial region of said plenum inlet vanes, acceleration maintains a desired radial depth of liquid inside said heater and centrifuge. When the plenum inflow fills the voids between the radial region of said plenum inlet vanes, FIG. 13a, 579, the plenum-inlet-vane overflow exits through gaps between said plenum inlet vanes. The gaps appear where the trailing portion of a vane overlaps the adjacent, trailing vane. To pass through said gaps, the inflow turns and must slow relative to the rotation. The angular speed of the plenum inlet vanes is greater than the angular speed of the overflow and the inner-radius surface of the trailing vane pushes the liquid radially inward toward the turbine inlet. The inward push counters radial acceleration caused by the viscosity of the pressurized liquid in said turbine-inlet plenum. Alternate embodiments of vane angles, curvatures, and placement in said inlet plenum that achieve the same radial, liquid-gas interface inside said water heater and centrifuge are likely possible.

Figure 14:
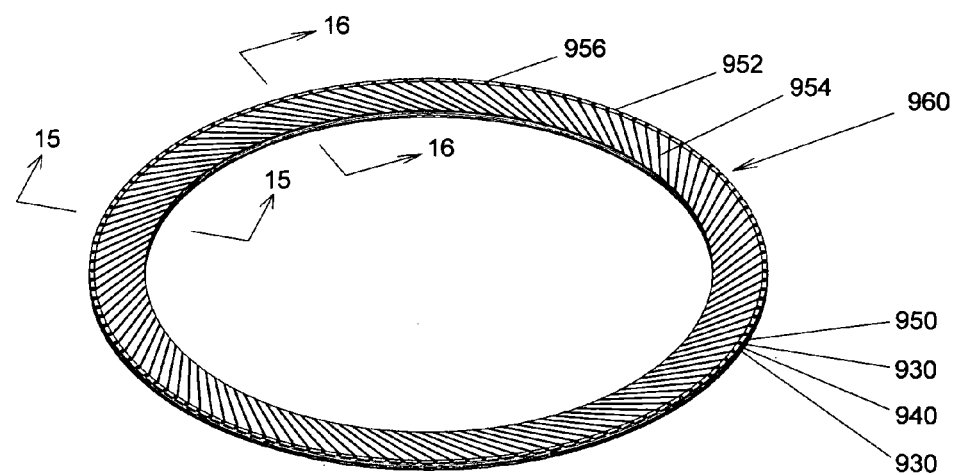
FIG. 14 is an isometric view of one membrane wall assembly.
Figure 15:
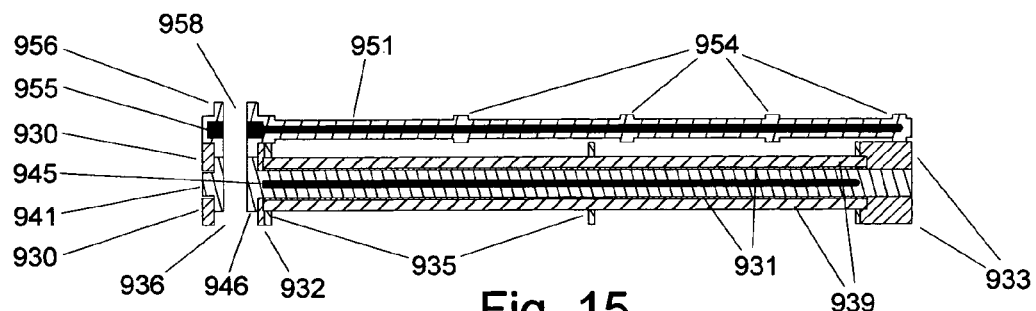
FIG. 15 and FIG. 16 are section views of the membrane wall assembly.
Figure 16:
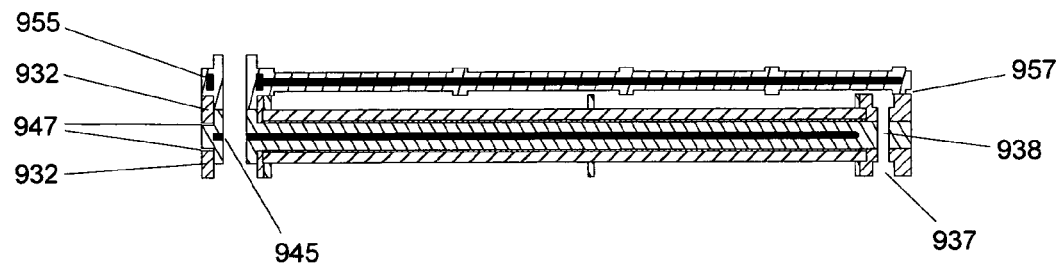

FIG. 14 is an isometric view of the membrane wall assembly, 960. Section views are illustrated in FIG. 15 and FIG. 16. Each said membrane wall assembly includes one negative bias disc, 950, two membrane disc assemblies, 930, and one positive bias disc, 940, between the two said membrane disc assemblies to form gas-trapping, membrane pocket assemblies. Said negative bias disc has a circular array of insert bosses, 956, which emanate both upward and downward from outer annular wall, 952. Low profile angled vanes, 954, originate from said outer annular wall, the lower surface of which is a reflection of the upper surface visible in FIG. 14.

FIGS. 15 and 16 are cross-section views at a larger scale of the membrane wall assembly. FIG. 15 illustrates the cross-section when said negative-bias electrode plate, 955, makes contact with said long bolts, FIG. 17, 926. Said long bolts pass through fastener passage, FIG. 15, 958, that extends through insert boss, 956. Negative-bias-disc insulation, 951, encapsulates said negative-bias electrode plate. Low profile, angled vanes, 954, emanate from the upper and lower surfaces of said negative-bias-disc insulation. Membrane discs, 931, and membrane backing, 939, of membrane disc assemblies, 930, span between outer-radius and inner-radius annular frames, 932 and 933, respectively. Two membrane discs surround positive-bias electrode plate, 945, encapsulated in positive-bias-disc insulation, 941. Insert boss, 946, of said positive bias disc, seats in bias-plate insert passage, 936, of said outer-radius annular frame. Inter-frame webbing, 935, rigidly secures said outer-radius annular frame to said inner-radius annular frame. FIG. 16 illustrates the cross-section of said membrane wall assembly when said positive-bias electrode plate, 945, makes contact with said long bolts. Negative-bias electrode plate, 955, does not make contact with said long bolts. Both cross-sections are at locations where low profile vanes, FIG. 9, 944, contact said membrane discs. In locations, away from said low profile vanes, a void exists between said positive-bias-disc insulation and said membrane discs. Gas enters gas-trapping membrane pockets through narrow slits of gas trap inlets, FIG. 16, 947, disposed at the outer radius of the membrane wall assembly. Threaded fasteners, not drawn, pass through threaded-fastener passages, 937, and 938, of inner-radius annular frame of said membrane assemblies and inner annular wall of said positive bias disc, respectively. The head and nut of said threaded fastener secures against threaded-fastener seats, 937, disposed in opposing inner-radius annular frames. Hydrogen gas is exhausted from said membrane wall assembly through hydrogen exhaust outlets, 957. Said inner-radius annular frame might be a nickel and steel alloy that is dimensionally stable through a range of temperatures. As the temperature increases, expansion of said outer radius frame adds stress in the radial direction across said membrane discs, thereby aiding permeation through said membrane.

FIG. 17 discloses the connections of said negative bias distributor plate, 922, to said negative-bias electrode plate, 955, and said positive bias distributor plate, 923, to said positive-bias electrode plate, 945. Slip rings, 913, make contact with said positive and negative distributor plates through slip ring lugs, 911, that secure to distributor plate extensions, 925. Bolt passages arrayed around said negative distributor plate alternate in size such that only alternating long bolts, 926, make electrical contact with said negative distributor plate when it is encased in insulation. Similarly, bolt passages arrayed around said positive distributor plate alternate in size such that only alternating long bolts that do not make contact with said negative distributor plate, make electrical contact with said positive distributor plate. Long bolts making contact with said negative bias distributor plate make contact with said negative-bias electrode plate, 955, as shown in FIG. 15. Long bolts making contact with said positive bias distributor plate make contact with said positive-bias electrode plate, 945, as shown in FIG. 16. Said negative and positive-bias, electrode plates and distributor plates are shown in FIG. 17 without the encasing insulation of said negative bias disc and said positive bias disc, respectively.

The inner-radius annular frames, low profile, angled vanes, and inner annular wall stack to form a stable, cylindrical-shell structural column. The outer-radius annular frames, low profile vane and insert bosses, and outer annular wall stack to form a stable, cylindrical-shell structural column. When the assembled stack is held in compression by said long bolts and threaded fasteners joining said gas-trapping, membrane disc assemblies to said positive bias disc, said membrane wall assembly is watertight.

FIGS. 18 and 19 are isometric views of said intermediate impeller columns and main impeller columns, respectively. Both said impeller columns have vertical stud flanges, 731, at the inner radii, thereof. Both said impeller columns have blower cladding flanges, 732, top flanges, 733, base flanges, 735, inner wall flanges, 740, and webbing, 747, between all said flanges. Said main impeller column, FIG. 19, extends radially beyond said intermediate impeller columns in the lower section thereof. Said synthesizer-inlet lower plate rests on said lower plate flange, 734. Interstage channel vanes, 737, are disposed between interstage channel flanges, 738. Said interstage channel vanes have leading vane edges at a greater radius from the axis-of-rotation than the trailing edges thereof. The resulting forward-curved vane angle accelerates product in said interstage channels toward the inlets of the next, lower compressor stage. Webbing, 747, is disposed between all other flanges defining said radial extension of said main impeller column.

FIG. 20 is an isometric view of said synthesizer inner-wall assembly, 760, from below the horizontal plane. Said impeller blades, 763, are permanently adjoined to said inner wall, 769, and said compressor stage base plate, 762, making the resulting assembly rigid. Said condenser bed impellers, 764, do not extend to the height of the lowest compressor stage base plate. The small gap avoids radial acceleration of product until it is at the level of said condenser beds. Vertical posts, 708, at the arc-end extremities of the lower inner wall prevent product from entering the area of the outer frame of said condenser bed, and which does not coincide with a frame opening into said condenser bed. An alternate embodiment might have different vane angles.

FIG. 21 is an isometric view of said multistage compressor outer wall, 770. Said impeller blades, 773, are permanently adjoined to said outer wall, 774, and said compressor stage, upper plate, 772, making the resulting assembly rigid. Bottom plate, 778, rests on the top surface of said condenser bed, and is held steady by the lower surfaces of the lowest interstage channel flange of said main impeller columns, detailed in FIG. 19. The center impeller blades will likely have small horizontal flanges added at the lower edges. Each flange will side into a shoe added to said base plates of said synthesizer inner-wall assembly, better securing both assemblies. Alternate embodiments might combine the inner and outer wall assemblies herein into plug-in, multistage centrifugal compressor sections or a single, multistage, centrifugal compressor.

FIG. 22 is an isometric view of the components that make said float valve assembly, 830. Valve plug, 831, slides onto valve plug seat, 835, and is held in place by valve plug retainer, 836. Float body, 842, slides over float sled guide tubes, 838. The outer-radius, exterior surface of said float body abuts the float sled base, 837. Float sled retainer, 839, slides over said float sled guide tubes, and holds said float body between said float sled base and said float sled retainer. Float spring, 841, is held between spring seats, 844, disposed in said float sled retainer and said float rod cap, 843. Said float sled guide tubes slide on said float rods, 840.

FIGS. 23*a* and 23*b* are isometric views of said condenser bed, 790. Product enters said condenser bed through frame openings, FIG. 23*b*, 792. Screens, 793, are disposed in said frame openings. Multiple, concentric layers of catalyzing screen are embedded in each condenser bed frame. The inner-radius screens have furrows between screen perforations. The furrows trap carbon solids. Perforations through one screen layer align with furrows in the next layer. Radial acceleration holds solids against the screens within the furrows. The flow of gas erodes the trapped carbon. Finer solids filter outward to intermediate screen layers. The screens of the outer layers are likely of felted metal that maintains a desired reaction pressure in the condenser beds. As the layers progress outward, the exposed screen area increases with the increasing radius. Said catalyzing screens are held taut by said condenser bed frame, 791. All frame layers are fused to form a single piece. Intermediate, vertical frame members have an outer-radius extension, 795. Said outer-radius extensions provide vertical channels through which product passes downward as it exits said condenser beds.

FIGS. 24*a* and 24*b* are isolated, isometric views of condenser bed housing, 780. Said condenser bed slides into said condenser bed housing from above, and rest on said condenser-cavity, base plate, 784. Cooling fins, 788, conform to the curvature of condenser-cavity outer wall, 783. Said cooling fins add rigidity to said condenser-cavity outer wall, while removing excess exothermic energy released by hydrogenation reactions.

FIG. 25 is an exploded, isometric view of the turbine-inlet governor. Steam gate valve, 675, rotates in gate valve channel, 678. Apertures, 676, align with steam portholes, 673, when the gate valve is fully open. Said steam gate valve rides on a circular array of bearings, 679, disposed at the base of said steam gate valve. The bearings facilitate rotation of said steam gate valve. Rotation is caused by a circular array of plenum float assemblies, 680. Each said plenum float assembly has a gear wheel, 685, that inserts into a gear entrance, 674, disposed in turbine-inlet, governor housing 671. The teeth of said gear wheel, shown enlarged in FIG. 25*b*, mesh with the teeth of a gear, 677, disposed at the base of said steam gate valve and shown enlarged in FIG. 25*a*. The gear teeth are symbolic and not a design of actual gear teeth. Each float valve rotates about a pin, 684, that seats in the upper and lower flanges, 672, of said turbine-inlet, governor housing. Said pin passes through hinge, 683. Swing arm, 682, secures the float, 681, to said plenum float assembly. If the inlet plenum is empty of liquid, rotation causes said plenum float assemblies to rotate counterclockwise until said floats fully extend into the float recesses, FIG. 13, 569, which closes said gate valve. When water fills the inlet plenum, plenum impellers, FIG. 13, 568, pull the pressurized liquid inward. The upper portion of the wall surrounding the carbon channel, FIG. 13, 567, accelerates liquid into said float recesses. The liquid causes said plenum float assemblies to rotate clockwise, opening said gate valve.

FIG. 26 is an isometric view from below the radial plane of the steam emitter ring, 660. Fasteners pass through fastener holes, 664, disposed in flange, 663, and join said upper plate, FIG. 13, 560, said inner-perimeter wall, FIG. 11, 701, and said steam emitter ring to said turbine rotor, FIG. 5, 600. Upper main bearing, FIG. 5, 250, seats against upper bearing seat, FIG. 26, 665. Pressure reduction rings, 662, align with pressure ring channel, FIG. 5, 243, disposed in stage 1 stator ring, FIG. 5, 240. Steam passes into the steam turbine through said steam inlets, 661. An alternate embodiment might combine said steam emitter ring and said turbine-inlet governor into a single assembly, where said steam portholes, FIG. 25, 673, disposed at the inner radius of said turbine-inlet governor housing, FIG. 25, 671, are closed, curved channels leading to said steam inlets, or the gate valve, FIG. 25, 675, is a flat disc having apertures, FIG. 25, 676.

Figure 27:
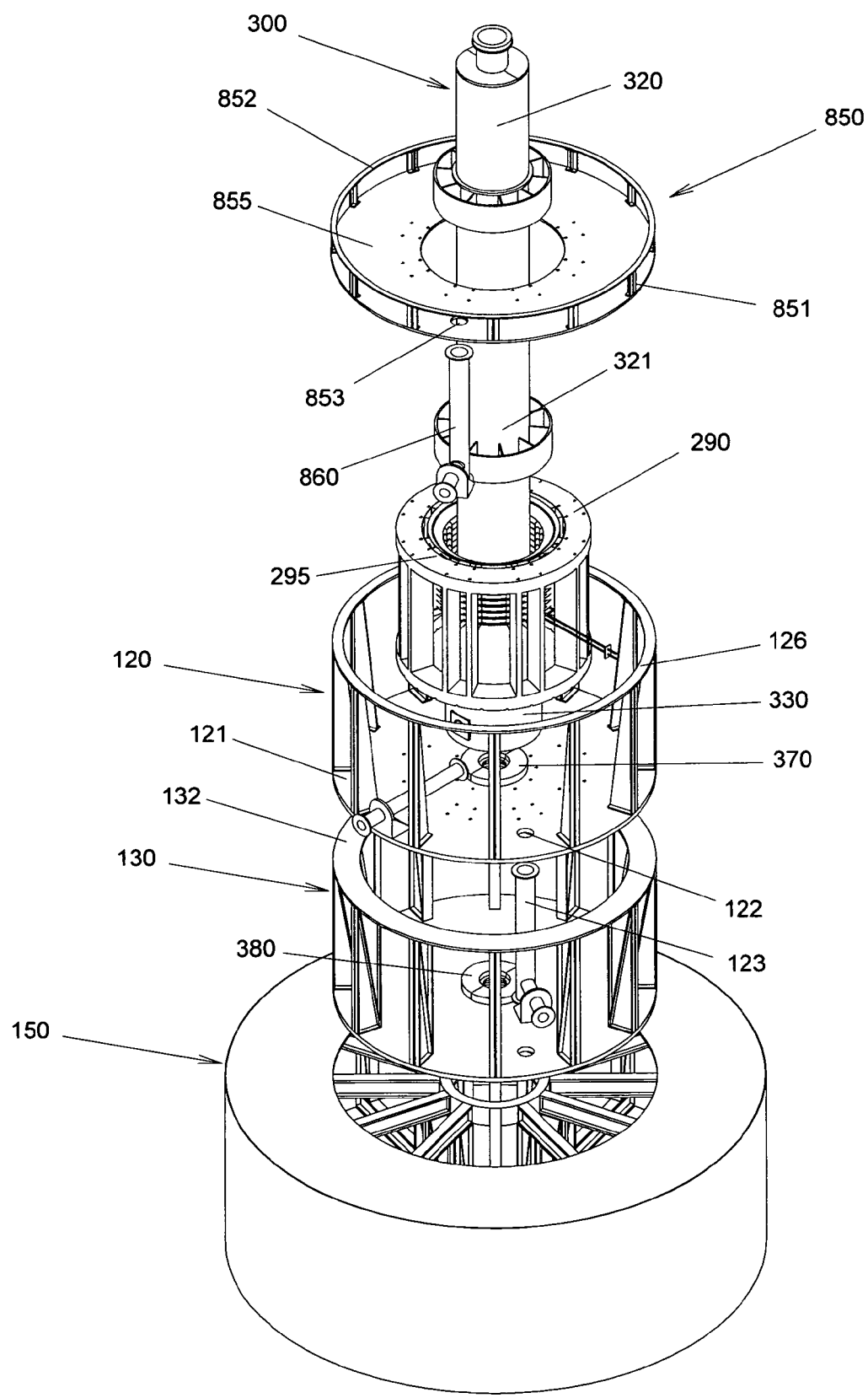
FIG. 27 is an exploded isometric view of the likely arrangement of the components of the base of the solar-powered, liquid-hydrocarbon-fuel synthesizer. The rotor pedestal, fuel catch basin, steam turbine outlet, steam condenser coils, motor/generator room, and secondary water reservoir are shown separated.

FIG. 27 discloses the likely arrangement of the supporting structure. Because of scale, fasteners are mentioned in this and other figures, but are not drawn. Said turbine-housing base, FIG. 5, 210, is supported on the turbine-housing pedestal, FIG. 27, 290. Basin floor, 855, of the collection basin, 850, is secured between said turbine-housing base and said turbine housing pedestal. The flange of said sliding rotary seal, FIG. 8, 870, attaches to upper flange ring, FIG. 27, 852, of said collection basin. Liquid fuel drains from said collection basin, through the collection basin drain, 853, and into fuel outlet pipe, 860. Said fuel outlet pipe connects to external piping, not drawn, that channels the liquid fuel to ground level and away. Curved panels, not shown in FIG. 27 fasten to the vertical frame members, 851, said basin floor, and said upper flange ring, to provide a leak-tight reservoir.

Fasteners secure said rotor pedestal base, 330, of said rotor pedestal assembly, 300, to the turbine-outlet floor plate, 121. Said turbine housing pedestal is also secured to said turbine-outlet floor plate. When secured, said turbine-housing pedestal encircles said rotor pedestal base. Steam condenser, 295, is disposed between said turbine housing pedestal and turbine-outlet inner wall, 321, in the lower section of said rotor pedestal, 320. Said condenser coils are suspended from the interior of said turbine-housing pedestal. Pipe bearing support, 370, which aligns said stationary pipe, FIG. 6a, 310, is fastened to said turbine-outlet floor plate.

Condensation, from said steam turbine exhaust, drains through condensate drain, 122. The water flows through drain pipe, 123, disposed in said generator room, 130. The water flows into said secondary water-storage tank, 150. The outer cage of said lower pipe bearing, FIG. 7, 442, presses into lower pipe bearing support, FIG. 23, 380. Said water pipe, FIG. 7, 423, and impeller screw, FIG. 7, 450, descend into said secondary water-storage tank. Burners that use natural gas or other fossil fuel to heat water in said water heater and centrifuge might be added to the supporting structure. The burners might be on a movable structure that swings or otherwise retracts out of the sight line between the heliostats and the water heater and centrifuge. A vent pipe might extend from the turbine outlet or secondary water reservoir, said vent pipe venting oxygen gas, that is disassociated from water in said water heater and centrifuge, to the added burners, thereby increasing the heating efficiency of the burners.

The embodiment herein is illustrative, and not intended to fix or limit design parameters which depend in part upon the location of the installation. Alternate embodiments might vary in membrane-disc surface area, total membrane assemblies used, various operating radii such as that of said water heater and centrifuge, condenser metals, total layers and dimensions, angular speeds, electrical generating capacity, and other parameters. All such alternate embodiments are included within this invention.

What is claimed is:

1. A rotating, synchronous reaction cell that extracts hydrogen gas from water, mixes the gas with carbon in a cyclic flow through catalyzing beds, separates liquid from gaseous reaction products and expels liquid product, and expands steam through a turbine to cause rotation and turn a generator, the enumerated chemical processes, as well as other underlying processes within said enumerated processes, being integrated into a unitized rotating device, the rotating unit and its stationary support thereby being suitable by the self-contained design, for mounting and operating atop a tower and solar energy for process heat, and being a liquid-hydrocarbon-fuel synthesizer, in which water is accelerated in a centrifuge, said centrifuge interior first resembling a thin cylindrical-shell void but having a circular array of vanes that extend from the outer radius to the inner radius of the cylindrical shell void, and from the top radial plane to the bottom radial plane of the cylindrical shell, said vanes accelerating water or other fluid within said centrifuge, in which heat is applied to the cylindrical outer-radius, exterior surface of said centrifuge, said centrifuge thereby being a water heater and centrifuge, in which said heat is transferred to water bearing against the inner-radius interior surface of the outer-radius containment wall of said water heater and centrifuge and said vanes emanating inward therefrom, in which the transfer of heat to the water inside said water heater and centrifuge raises the number of water molecules having sufficient energy to disassociate into hydrogen and oxygen according to the Maxwell distribution of energy, in which hydrogen gas in the centrifuged water is driven radially inward by induced buoyancy, as compressed water that is heated in said water heater and centrifuge is channeled through a circular plenum to a turbine where steam expands through said turbine that causes rotation of said water heater and centrifuge, in which radially-inward-driven hydrogen gas collects in a stacked array of gas-trapping pockets, the stacked array enclosing said water heater and centrifuge at the inner-radius and providing a watertight boundary; said gas-trapping pockets being a narrow annular void divided into a circular array of smaller cavities by vanes disposed in the interior thereof, having interior surfaces made of a hydrogen-permeable and hydrogen-selective membrane material, and being closed at the inner radius thereof, in which hydrogen gas trapped by buoyancy in the gas-trapping membrane pockets permeates through said hydrogen-selective membrane material and enters a gas inlet of a hydrocarbon synthesizer; said gas-trapping membrane pockets enclosing said gas inlet at the outer radius; said hydrocarbon synthesizer, water heater and centrifuge, and turbine rotor turning at the same angular speed as one assembly, in which hydrogen gas entering said gas inlet of said hydrocarbon synthesizer is mixed with injected carbon at the entrance of a compressor, the hydrogen gas and carbon passing through said compressor that mixes and pressurizes the reactants, in which the pressurized mixture of hydrogen gas and carbon is channeled into one or more condenser beds; said condenser beds having multiple, cascading layers of screens that are secured in tension by the rigid frame of said condenser bed, said rigid frame having a matrix, grid or honeycomb of smaller sieve pockets penetrating the radial distance through said rigid frame, with each smaller sieve pocket therein having multiple, cascading layers of screens in the radially-outward direction, in which said screens are coated with platinum-group, catalyzing metals and in which said screens trap larger carbon particles and hold the carbon in suspension in furrows disposed between perforations through said screens or by other similar means, and in the path of fluid molecules flowing through said perforations through said screens, in which the catalyzing material of said condenser beds causes various reactions of hydrogen and carbon within said sieve pockets of said condenser beds, the various reactions producing a variety of hydrocarbon molecules, in which products exiting at the outer radius of said condenser beds are channeled into an adjoining liquid-gas-separating centrifuge where the products are segregated by density, so that gaseous hydrocarbon molecules and hydrogen gas are drawn out from said centrifuge into the low-pressure inlet of a recirculating blower disposed at the inner radius of said liquid-gas-separating centrifuge while liquid hydrocarbon molecules and fine carbon solids accumulate in said liquid-gas-separating centrifuge, in which said recirculating blower exhausts the gaseous hydrocarbon molecules and hydrogen gas drawn from said liquid-gas-separating centrifuge, into said gas inlet of said hydrocarbon synthesizer where the exhausted gaseous mixture combines with hydrogen gas that has permeated through said hydrogen-selective membranes, the blended gas stream entering said compressor that mixes and pressurizes hydrogen and carbon before channeling the mixture into said condenser beds, in which float valves, that are disposed in a circular array around the interior surface of the outer-radius containment wall of said liquid-gas-separating centrifuge, have an effective density, including spring force, of about that of liquid hexane, such that, as hydrocarbons that are denser than liquid hexane accumulate, a predetermined radial depth of accelerated liquid hydrocarbons causes said floats to rise radially inward, off valve seats that surround exhaust ports that penetrate through the outer-radius containment wall of said liquid-gas-separating centrifuge, in which opening said exhaust ports allows liquid hydrocarbons and entrained carbon solids having a density greater than hexane to exit said hydrocarbon synthesizer, such that the all of the described parts and processes rotate as a unit turned by the expansion of steam through said steam turbine; the rotation causing buoyancy in said water heater and centrifuge, evacuating water from said gas-trapping pockets, recirculating gaseous hydrocarbons and hydrogen molecules through one or more said catalyzing condenser beds where said recirculation builds hydrocarbon molecules until a desired density is reached, and the centrifuging of the reaction products which isolates and exhausts denser liquid hydrocarbons.

2. The device of claim 1 having a large-area, membrane surface, the membrane being a stacked array of annular discs that selectively filter hydrogen gas, said stacked array of large-area, hydrogen-selective membranes closing said water heater and centrifuge at its inner-radius, in which an annular membrane disc spans between two framing rings, one framing ring being disposed at the inner radius of said annular membrane disc and the other framing ring disposed at the outer radius of said annular membrane disc, the inner-radius and outer-radius annular frames being coaxial with, and adjoining said annular membrane disc along the circular edges thereof, the aggregate being a membrane disc assembly, in which a third, non-membrane annular disc is interposed between two, facing membrane disc assemblies, the radial plane of said third disc being parallel to the radial planes of said surrounding, adjacent membrane disc assemblies, in which said third disc has vanes circularly arrayed around the disc, the blades of which emanate from the opposing flat surfaces of the third disc, said flat surfaces of said third disc being parallel to, or nearly parallel to the surfaces of said membrane disc assemblies; the outermost surface of the vane blades, away from the flat surfaces of said third disc, abutting the surfaces of said annular membrane discs, said vanes of said third disc terminating at an inner radius where said third disc increases in thickness to form an annular wall having the same elevations as said opposing vane blades and the same radii as said annular frame disposed at the inner radius of said membrane disc assembly, in which said inner-radius annular frames of two said membrane disc assemblies and the annular wall that is disposed at the inner radius of said third disc are joined, the assembly of two membrane disc assemblies and said third disc yielding narrow gas-trapping membrane pockets open at the circumference thereof, closed at the inner-radius annular wall, and disposed between said vanes of said third disc, said larger assembly of parts being called gas-trapping, membrane pocket assemblies, in which said vane angle of said third disc is aligned with the radial direction from the axis-of-rotation, or another angle such that the outer-radius termini of said vanes leads or trails the vane origins from said annular wall, said vane angle and angular speed being chosen for a given water temperature to fix a design pressure inside said gas-trapping membrane pocket assemblies, said angle of said vane blade being constant or changing across the length of said vane, in which a fourth, non-membrane disc of the same radii as said membrane disc assembly is disposed between adjacent pairs of gas-trapping membrane pocket assemblies, in which the fourth disc has vanes circularly arrayed around the annular disc, the blades of which emanate from the flat opposing surfaces of the fourth disc, said flat surfaces of said fourth disc being parallel to, or nearly parallel to the surfaces of the membrane disc assemblies; the outermost surface of the vane blades, away from said flat surfaces of the fourth disc, abutting the surfaces of the inner-radius, annular frames of said membrane disc assemblies, and said vanes of said fourth disc terminating at an outer radius where said fourth disc increases in thickness to form an annular wall having the same elevations as said vane blades of said fourth disc and the same radii as said annular frame disposed at the outer radius of said membrane disc assembly, said vanes of said fourth disc having an angle from the radial direction such that the inner-radius termini of said vanes trail the outer-radius origins of said vanes relative to the direction of rotation of the device of claim 1, in which said annular membrane disc is composed of a thin-wall membrane of vanadium, niobium or alloys thereof clad in palladium, and spanning between said annular frames; said thin-wall membrane being backed by a porous material, such as filter sheet, porous steel, or felted metal or a combination of filter sheet, porous steel, or felted metal, that does not impede permeation of hydrogen through said thin-wall membrane, while adding strength such that said thin-wall membrane resists pressure and acceleration present in said gas-trapping membrane pockets; and in which the resulting composite membrane is backed by a deflection-resisting honeycomb webbing that rigidly ties said inner-radius and outer-radius annular frames, in which fastening devices tightly join said annular frames disposed at the inner radii of two said annular membrane discs to said annular wall disposed at the inner radius of said third disc, in which longer fastening devices tightly join multiple gas-trapping membrane pocket assemblies to said fourth discs, said longer fastening devices passing through said annular frames disposed at the outer radii of said annular membrane discs and passing through said annular wall at the outer radius of each said fourth disc, such that said vanes of said third disc moderate the gas pressure exerted against said membrane discs inside said gas-trapping membrane pocket assemblies, while said vanes of said fourth disc exhaust hydrogen gas emerging from said membrane disc assemblies into said adjoining hydrocarbon synthesizer, such that said third and fourth discs and said membrane disc assemblies when joined create a watertight, hydrogen-permeable, membrane wall disposed at the inner radius of said water heater and centrifuge, and such that when joined said annular frames of said membrane disc assemblies, said annular walls disposed at the inner and outer radius of said third and fourth discs, respectively, and the vane blades thereon, stack to form stable columns disposed at the inner and outer radii of the aggregate assembly.

3. The device of claim 1 having a means of evacuating water from the surfaces of said hydrogen-selective membranes disposed in said gas-trapping pockets at the inner radius of said water heater and centrifuge, as water inside said adjacent water heater and centrifuge is heated to temperatures exceeding the boiling-point of the centrifuged water, in which the inlet pressure of cool water entering said water heater and centrifuge is raised above or equal to the vapor pressure of heated water inside said water heater and centrifuge by radial acceleration through injection channels, in which the pressure from cool water injected into said water heater and centrifuge when distributed at the inlets into said gas-trapping membrane pockets is lowered, according to Pascal's principle of hydraulics, by the ratio of the sum of the cross-section areas of the water-injection channels to the sum of the circumferential areas of the inlets into said gas-trapping membrane pockets, in which vanes disposed within the interiors of said gas-trapping membrane pockets produce outward pressure from water within said gas-trapping membrane pockets that exceeds the pressure at the inlets into said gas-trapping membrane pockets produced by cool water injection, so that water therein is expelled to a radius that is greater than the membrane surface inside said gas-trapping membrane pockets, in which the vapor pressure of heated water inside said water heater and centrifuge exceeds the radially-outward pressure produced by vanes inside said gas-trapping membrane pockets on water at the inlets into said gas-trapping membrane pockets, p1 in which the pressure of water, entering the inlet plenum of said steam turbine from said water heater and centrifuge, is raised by radial acceleration caused by rotation of vanes disposed inside said inlet plenum and adjacent to a circular array of inlet passages into said inlet plenum, the length and angles of the circularly-arrayed vane blades being fixed to maintain sufficient pressure inside said adjacent water heater and centrifuge while producing a liquid-gas interface at a desired radial depth inside said water heater and centrifuge; where acceleration of liquid inside said inlet plenum at a smaller radius than said circularly-arrayed vanes is limited to acceleration caused by viscosity that is countered by radially-inward-pushing impellers disposed within said inlet plenum at a smaller radius, in which flow from said inlet plenum into said steam turbine is regulated by a valve that opens only when liquid fills, in a radially-inward direction of flow, said inlet plenum leading to said steam turbine, said valve preventing steam from escaping through said steam turbine in an unthrottled manner that partially or fully evacuates said water heater and centrifuge of the pressurized liquid therein, such that steam and other light gases escape from heated water in said water heater and centrifuge and enter said gas-trapping membrane pockets, replacing water expelled therefrom as water inside said adjacent water heater and centrifuge is heated to temperatures exceeding the boiling-point of the centrifuged water.

4. The device of claim 1 having an integral means of separating liquid hydrocarbons having a density that is greater than hexane from other hydrocarbons having a density that is equal to or lower than the density of hexane, said device being a liquid-gas-separating centrifuge, in which a circular array of impeller vanes are disposed near the outer radius of the interior of an annular tub, said tub and impeller vanes therein being a centrifuge, in which the inlet to an adjoining, recirculating blower is disposed near the inner radius of the interior cavity of said annular tub of said centrifuge, in which float valves are disposed in a circular array around the inner-radius surface of the outer-radius wall of said annular tub and between said impeller vanes; said float valves being held against said outer radius wall by springs that bear against said float valves, and the valve of said float valves seating in and blocking ports that penetrate through the outer-radius wall of said annular tub, in which the effective density of said float valves and springs is about the density of liquid hexane when radially accelerated by said impeller vanes of said liquid-gas-separating centrifuge, such that said float valves rise from the exhaust ports and compress said springs only when liquid denser than hexane accumulates between said impeller vanes; the unblocking of said exhaust ports by the motion of said float valves allowing the accumulating liquid to exit said liquid-gas-separating centrifuge, in which the radial depth of said impeller vanes in said liquid-gas-separating-centrifuge equals the depth of accumulating liquid plus the distance the float valve must rise to allow liquids to exit through said ports; said impeller vanes having small passages through the blades at the lower, outer radius thereof, such that the accumulating liquid is equalized between said impeller vanes of said centrifuge, in which a liquid volume exceeding the accelerated volume between said impeller vanes is not accelerated by said liquid-gas-separating centrifuge, such that the vapor pressure of a liquid having a density equal to or lower than hexane, in the low pressure environment caused by the inlet of said recirculating blower disposed near the inner radius of said annular tub, causes said liquids to become a gas that is drawn into the inlet of said recirculating blower.

5. The device of claim 1 having an integral inlet, which turns at the same angular speed as said steam turbine rotor, said integral inlet simultaneously feeding water into the water heater and centrifuge and carbon into the hydrocarbon synthesizer, and being called an integrated inlet, in which said integrated inlet consists of a water pipe with a impeller screw attached to the lower end thereof, in which said impeller screw is disposed in a housing that encircles and is affixed to the blades of said impeller screw at the outer radius thereof, and the impeller housing narrowing in radius above said impeller blades and hub, thereby becoming a hollow pipe extending from said impeller screw and permitting attachment to said water pipe, in which said attached impeller screw is submerged in water and rotates and pushes water upward through said water pipe, in which said water pipe has a helical, auger blade affixed to the exterior surface thereof, in which said auger blade and water pipe turn in a surrounding, stationary pipe such that rotation of the helical auger blade moves carbon solids through said stationary pipe in the same direction water moves through the hollow center of said water pipe, in which the end of said water pipe that is opposite said impeller screw is rigidly attached to a water chamber that rotates at the angular speed of said steam turbine rotor, said water chamber connecting to a circular array of closed, water-injection channels that lead to said water heater and centrifuge; said water chamber being segregated from an adjoining chamber where carbon exhausts outward from said stationary pipe surrounding said auger blade, said adjacent chamber connecting to a circular array of closed inlet channels that extend to the entrance of said compressor of said hydrocarbon synthesizer, in which said integrated inlet and stationary pipe are disposed through the axial center of said steam turbine rotor to which said integrated inlet is indirectly affixed.

6. The device of claim 2 using charged electrode plates between said hydrogen-selective membranes and said annular membrane discs to indirectly induce a bias at the membrane surface by creating an electric field that crosses the membrane discs, said bias being negative at the membrane surface facing into said gas-trapping membrane pockets and aiding the absorption of hydrogen into the membrane material; the electrode plates being arranged so a positively-charged electrode plate is disposed inside said gas-trapping membrane pockets and a negatively-charged electrode plate is interposed between adjacent membrane surfaces facing into the gas inlet into said hydrocarbon synthesizer; charge to said electrode plates being transferred through a circular array of long fasteners that secure said hydrogen-selective membranes and said annular membrane near the inner-radius interior of said water heater and centrifuge; said electrode plates being encapsulated in a high-softening-temperature material of said third and fourth discs, such that said electrode plates add tensile strength and charge while said molded material encapsulating said electrode plate reduce weight and provide electrical insulation.

7. The device of claim 1 having a large catalyzing surface area for synthesizing, by surface catalysis, a variety of hydrogen-carbon reactions that form hydrocarbon molecules, in which a mixture of hydrogen, hydrocarbon gases and carbon flow through a sieve, said sieve consisting a frame having matrix of small openings and having screens stretched across the matrix of small openings through said frame, in which said frame and said stretched screen have the curvature of an arc-segment of a cylindrical shell and said small openings penetrating through said frame are in a radially outward direction relative to the curvature of said frame, in which the fabric or material of said screen is coated with a catalyzing material such as various allotropes or alloys of the platinum group of metals, in which multiple layers of said screen of said sieve are disposed at different radii of curvature of said frame, said multiple layers increasing the total surface area of screen exposed to reactant flow through the matrix of openings through said frame, in which the perforations through said multiple layers of said screens change, such that the screen layer disposed at one radius in said frame is less porous than screen layers disposed at smaller radii, thereby raising the internal pressure, in which the catalyzing material coating said screens change from screen layer to screen layer, such that the flow of reactants through changing catalysts produces a desirous pattern or sequence of reactions as the flow of reactants passes through the multiple screen layers of said frame.

8. The device of claim 1 having a circular array of structural impellers securing said annular tub of said liquid-gas-separating centrifuge to the base of said inlet plenum of said steam turbine, which simultaneously function as structural struts, as well as the impellers of said recirculating blower of claim 1.

9. The device of claim 1 having a circular array of structural impellers securing said annular tub of said liquid-gas-separating centrifuge to the base of said inlet plenum of said steam turbine, which simultaneously function as structural struts, as well as interstage impellers of said multistage compressor and the impellers of said recirculating blower of claim 1.

10. The device of claim 1 having multistage, gas-expansion turbine rotor having a hollow axle shaft, such that the integral, integrated inlet and stationary pipe pass through the axial center of said turbine rotor, said turbine rotor rotating on a bearing supported by a hollow turbine rotor pedestal through which said integral, integrated inlet and stationary pipe also extend.

11. The device of claim 1 in which said steam turbine reduces the weight borne by anti-friction bearings that support rotation, by vertically aligning the axis-of-rotation of the turbine rotor of said steam turbine so that turbine-inlet vapor pressure exerts an upward force against the pressure containing surfaces of the rotating assembly, thereby countering the force of gravity.

12. The device of claim 1 having a vertical axis-of-rotation that is conducive to mounting said device at the top of a tower at the focal center of an array of heliostats, and having a large, cylindrical heat absorbing surface suitable for heating by focused solar energy.

13. The device of claim 1 in which said water heater and centrifuge is joined at the top to said circular inlet plenum which is joined to said turbine rotor, in which said structural impellers are joined to and support said inlet plenum which is joined to and supports said water heater and centrifuge, in which said structural impellers are joined to and supported at the bases thereof by said liquid-gas-separating-centrifuge, in which said structural impellers are joined to and support the lower circular plate which encloses said gas inlet of said hydrocarbon synthesizer which is joined to and supports said water heater and centrifuge at the bottom, in which said membrane wall encloses said water heater and centrifuge at the inner radius thereof and in which said membrane wall encloses said gas inlet at the outer radius thereof, in which an annular interior wall spans between said liquid-gas-separating-centrifuge and said inlet plenum, and encloses said hydrocarbon synthesizer at the inner radius, in which said hydrocarbon synthesizer encircles said steam turbine which encircles said integrated inlet, in which said integrated inlet is joined to a water inlet chamber and carbon inlet which is joined to the top surface of said inlet plenum of said steam turbine, in which said water inlet chamber has vanes that radially accelerate water outward to water-injection channels affixed to the upper surface of said inlet plenum, in which said injection channels join to injection channels that are affixed to said water heater and centrifuge, in which said injection channels affixed to said water heater and centrifuge are joined to injection passages through said lower circular plate that encloses said gas inlet, in which a lower, annular water distribution channel is joined to and supported by said lower circular plate that encloses said gas inlet, in which said compressor is joined to and supported by said structural impellers, in which said condenser bed are joined to said structural impellers.

14. The device of claim 1, which uses rotation to stimulate said enumerated chemical processes and which operates with the exterior surfaces of said reaction cell exposed to the atmosphere and thereby being susceptible to aerodynamic drag that increases the energy required to maintain angular momentum, having a generally cylindrical form such that rotation produces little aerodynamic drag in the direction of rotation and thereby minimizing the addition of energy required to overcome aerodynamic drag.

15. The device of claim 1 having a variety of possible embodiments based on different locales, operating temperatures, angular speeds, design radii or other dimensions, and means and methods of interconnecting of parts that make up the rotating and static assemblies such that the resulting alternate embodiment yields an integration of the same processes.

16. A part or all of the reaction cell design of claim 1 being used for hydrogen-based chemical processes other than the synthesis of hydrocarbons.

17. The device of claim 1 using heat derived from the combustion of fuels such as light hydrocarbon gases, including but not limited to methane, ethane, butane or propane, heavier hydrocarbons such as oil and diesel fuel, fuel derived from oil shale, coal, or coal gas, in place of, or in addition to reflected solar energy to heat said water heater and centrifuge, including heat derived from combustion of said fuels during times of low or no insolation where the addition of heat extends production from said device of claim 1 into or through the night.

18. The device of claim 1 using heat derived from nuclear fission or fusion in place of reflected solar energy to heat water in said water heater and centrifuge.

19. The device of claim 1 using clean energy sources such as heat from electricity derived from wind-driven electric generators or heat derived from geothermal wells in place of reflected solar energy to heat water in said water heater and centrifuge, including during times of low or no insolation where said heat extends production from said device of claim 1.

20. The device of claim 1 producing an excess of electricity generated by said electric generator that is a part thereof, said excess of electricity being added to the electric grid either as a single supplier of electricity, as a cooperative of multiple suppliers of electricity, or as one or more business entities controlling one or more solar-powered, liquid-hydrocarbon-fuel synthesizers, and said electricity being sold for its economic value, where a part or all of the proceeds of the sale of electricity are used to reduce the cost of the synthesized, liquid hydrocarbon fuel product, and where the production and sale of said excess electricity might reduce generating electricity by burning fossil fuels, with the reduction of burning fossil fuels reducing or eliminating carbon-dioxide penalties to a purchaser or subsequent purchasers of said excess electricity, the carbon-dioxide penalties being fines, fees, taxes, or other payments that might otherwise have been imposed upon or paid for carbon-dioxide emissions that would have resulted had the equivalent amount of electricity been generated by burning fossil fuels in air rather than being purchased, the carbon-dioxide penalties arising from present or future laws, treaties or other agreements aimed at reducing carbon-dioxide emissions, and where the economic value of carbon-dioxide penalties that are avoided by the purchase of said excess electricity might be construed to be a part of the economic value of said excess electricity sold, including if and when the person or persons, business or governmental entity that avoids said carbon-dioxide penalties is not, or are not, the first purchaser of said excess electricity.

* * * * *